US008880202B2

(12) United States Patent
Francino et al.

(10) Patent No.: US 8,880,202 B2
(45) Date of Patent: Nov. 4, 2014

(54) OPTIMIZATION SYSTEM USING AN ITERATIVELY COUPLED EXPERT ENGINE

(75) Inventors: Peter N. Francino, Renfrew, PA (US); Frederick C. Huff, Pittsburgh, PA (US); David G. Foster, Delmont, PA (US)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 574 days.

(21) Appl. No.: 13/112,697

(22) Filed: May 20, 2011

(65) Prior Publication Data

US 2012/0010758 A1 Jan. 12, 2012

Related U.S. Application Data

(60) Provisional application No. 61/363,060, filed on Jul. 9, 2010.

(51) Int. Cl.
| | |
|---|---|
| G05B 13/02 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G05B 17/02 | (2006.01) |

(52) U.S. Cl.
CPC ...................................... *G05B 17/02* (2013.01)
USPC ............................................ 700/28; 700/291

(58) Field of Classification Search
USPC .................................................. 700/28, 291
See application file for complete search history.

(56) References Cited

U.S. PATENT DOCUMENTS

| | | | |
|---|---|---|---|
| 5,873,251 A | * | 2/1999 | Iino ................................. 60/660 |
| 6,021,402 A | | 2/2000 | Takriti |

(Continued)

FOREIGN PATENT DOCUMENTS

| | | |
|---|---|---|
| EP | 0 077 685 A2 | 4/1983 |
| GB | 2 473 543 A | 3/2011 |

(Continued)

OTHER PUBLICATIONS

Search Report for Application No. GB1111675.3, dated Dec. 12, 2011.
Search Report for Application No. GB1111201.8, dated Oct. 28, 2011.

*Primary Examiner* — Mohammad Ali
*Assistant Examiner* — Ziaul Karim
(74) *Attorney, Agent, or Firm* — Marshall, Gerstein & Borun LLP

(57) ABSTRACT

An energy management system uses an expert engine and a numerical solver to determine an optimal manner of using and controlling the various energy consumption, producing and storage equipment in a plant/community. The energy management system operates the various energy manufacturing and energy usage components of the plant to minimize the cost of energy over time, or at various different times, while still meeting certain constraints or requirements within the operational system, such as producing a certain amount of heat or cooling, a certain power level, a certain level of production, etc. In some cases, the energy management system may cause the operational equipment of the plant to produce unneeded energy that can be stored until a later time and then used, or that can be sold back to a public utility, for example, so as to reduce the overall cost of energy within the plant.

49 Claims, 14 Drawing Sheets

(56) References Cited

U.S. PATENT DOCUMENTS

| | | |
|---|---|---|
| 6,681,155 B1 | 1/2004 | Fujita et al. |
| 2004/0049295 A1 | 3/2004 | Wojsznis et al. |
| 2007/0100503 A1 | 5/2007 | Balan et al. |
| 2008/0033786 A1 | 2/2008 | Boaz et al. |
| 2009/0062969 A1 | 3/2009 | Chandra et al. |
| 2009/0204245 A1* | 8/2009 | Sustaeta et al. ............... 700/99 |
| 2013/0006429 A1* | 1/2013 | Shanmugam et al. ........ 700/286 |

FOREIGN PATENT DOCUMENTS

| | | |
|---|---|---|
| WO | WO-2007/075458 A2 | 7/2007 |
| WO | WO-2008/003033 A2 | 1/2008 |
| WO | WO-2011/080547 A1 | 7/2011 |

* cited by examiner

OPTIMIZATION SYSTEM USING AN ITERATIVELY COUPLED EXPERT ENGINE

RELATED APPLICATIONS

This application claims the benefit under 35 U.S.C. §119 (e) of U.S. Provisional Application Ser. No. 61/363,060, entitled "Optimization System Using an Iteratively Coupled Expert Engine and Numerical Solver," filed Jul. 9, 2010, the entire disclosure of which is hereby expressly incorporated by reference herein.

TECHNICAL FIELD

This patent relates generally to optimization systems like energy management systems and, in particular, to an optimization system capable of optimizing the operational features of a plant, such as the costs/profits associated with the production, use and/or sale of a desirable product such as energy within a plant/community in which complex optimization decisions are present.

BACKGROUND

Energy management systems are generally used to manage the production and use of energy within, for example, an industrial power generation plant, an industrial manufacturing or production plant, a municipal plant, etc., in an attempt to assure adequate operation of the plant/community in response to unforeseen or unexpected events. In some limited instances, simplistic energy management systems have been used to manage the use and therefore the cost of energy within a plant. However, before deregulation of the power companies and the rise of the Independent Power Producer (IPP) program, energy management was primarily a concern of the industrial customer. As a result, outside of industrial uses, energy management systems are fairly simplistic in nature, taking the form of, for example, programmable thermostats used in residences, etc.

While industrial energy management systems currently exist in many forms, these energy management systems are limited in scope, are still fairly simple in nature and are not configured to determine the energy savings that might be obtained through a detailed analysis of energy production and usage costs in a particular plant configuration or situation. Thus, even the industrial energy management systems in use today do not obtain the energy cost savings that might be had in situations that can create use and/or sell energy in various forms, using various different types of plant equipment.

The most common use of industrial energy management systems is as a load shedding system within industrial manufacturing plants, which have had automatic load shedding systems for a long time. In general, load shedding systems determine the amount of load (plant equipment drawing power) that must be almost instantaneously removed from operation to keep the remaining portions of the industrial plant operational. Load reduction or shedding is typically performed in response to a system disturbance (and the consequent possible additional disturbances resulting from a primary system disturbance) that results in a power generation deficiency condition. Common system disturbances that can cause load shedding include equipment faults, loss of power generation equipment, switching errors, lightning strikes, etc. Industrial plant energy management systems respond to these conditions by employing any of a number of advanced schemes that determine which loads to shed at any particular time in response to a particular type of disturbance or event. In some cases, blocks of loads are turned off or loads may be shed based on a preset priority that can be modified. In some instances, neural networks have even been used to determine the order in which loads should be shed.

However, energy management systems in the form of load shedding systems are generally limited to turning off loads within the plant, and do not decide when or how to restart or reconnect loads within the plant. In fact, the reclosing of electrical breakers and the restoring of the loads in an industrial plant, after the breakers have been automatically opened by a load shedding system, has traditionally been performed manually. Restoring loads manually is not so cumbersome when it only has to be performed when a load shed was caused by an electrical disturbance, because these events do not occur that frequently within an industrial plant operating environment.

However, as electric power becomes a larger and larger portion of the cost of production within an industrial plant, it will be necessary to decide when to run the plant production equipment and when to idle the plant production equipment based on the economics of energy management. The increasing cost of energy (including the costs associated with electric and fossil fuel based energy generation) will make current production plants less competitive unless the industrial producers adapt. For example, it may be necessary, in some situations, to shift or to curtail production and large energy consumption operations in an industrial plant to off peak hours when electric rates are lower, so as to keep the plant running competitively. These types of determinations will lead to loads being shed and restored on a more frequent basis, as once the price of power is at a point where production can be economically resumed, it is advantageous to start production as quickly as possible, and so not to have to wait for the operators to manually restart the loads. Likewise, when loads can start being restored, the most critical ones should be restored first. This decision process makes the manual load restoration process even slower, resulting in loss of production.

Most industrial plants, as well as other energy consumers that use electrical power, typically rely at least in part on the public power grid, which is designed to provide electrical power or energy at any needed time. This electrical grid is, in turn, fed by numerous power plants or other power suppliers that operate to provide electric power to the grid based on forecasted demands or required loads. A typical power plant can produce energy using multiple different types of energy generation systems including, for example, steam powered turbine systems, fossil fuel turbine systems, nuclear power generation systems, wind powered generators, solar powered generators, etc. Currently, these power generation systems operate by producing a desired demand as currently forecast or needed by the power grid. However, these power generation plants generally use only simple techniques to optimize the running of the power plant so as to provide the required power. These optimization techniques may, for example, decide whether to run one or two boilers, which boiler system to run first based on their respective efficiencies, whether to provide power at the current time at all based on the going rate being paid for electricity, etc. Generally speaking, the decisions as to whether to run a power plant and/or what specific components of the power plant to run in order to provide the electrical energy, as well as the amount of electrical energy to produce, are made by power plant operators who use basic or general criteria, such as those expressed by rule of thumbs, to determine the best or "most optimal" manner of running the plant at the highest profitability. However, these plants could benefit from an energy management system that operates to determine the best set of equipment to run at any particular time to maximize the operating profit of the plant.

In a similar manner, users of the electrical power from the power grid, like industrial plants, municipal plants, residential or commercial properties, etc., can benefit from better energy management systems. In many cases, these entities are both consumers and producers of energy. For example, many industrial plants, in addition to obtaining electrical energy from the power grid, produce some of the energy they use, convert energy from one form to another form and/or are capable of storing energy to some degree. For example, many industrial plants, municipal plants, etc., include plant equipment that requires steam to operate. Thus, in addition to obtaining electrical energy from the power grid, these plants include power generating equipment such as boiler systems that consume other raw materials, like natural gas, fuel oil, etc. to operate. Likewise, many municipal plants, such as municipal heating plants, water treatment plants, etc, and many residential plants, such as college campuses, commercial buildings, groups of buildings in an industrial or research park, etc., have both power generation equipment and power consuming equipment. For example, many college campuses, city or other municipal systems, etc. use steam for heating purposes at certain times while, at other times, run electrically driven air conditioning systems, to provide cooling. These plants may include power generating equipment, such as oil and gas fired boilers, and these plants may additionally include power storage systems such as thermal chillers, batteries or other equipment that is capable of storing energy for use at a later time.

In these types of plants, operators, at best, tend to manage the creation, distribution and use of energy using a set of fairly basic or simplistic rules of thumb in an attempt to reduce overall energy costs. For example, operators may attempt to save on energy costs by shutting down certain systems or running these systems at a minimum level within the plant when the systems are not needed as much. In one example, the boilers used to create steam for heating purposes in a college campus may be shut down or may be run at a minimal level during the summer months, during weekends, or during spring or semester breaks when fewer students are present. However, because the operators of these systems only use basic or simplistic rules of thumb for altering the operation of the plant to save on energy costs, the operators quickly lose the ability to determine the best or most optimal methodology of running the plant equipment (including equipment that may create energy in various forms, use energy in various forms, convert energy from one form to another form, or store energy in various forms) so as to reduce the overall costs of energy within the plant. This problem is exacerbated by the fact that the operators do not typically know the exact cost of running any particular piece or set of equipment at any particular time because the costs of the energy from the power grid, natural gas costs, etc. change regularly, and may change significantly even during a single day.

Still further, while power plants are specifically designed to create and sell energy to the power grid, many other types of industrial plants, such as process plants, municipal plants, etc. can now sell energy that they create to a power grid or to another consumer. The operators of these systems, however, do not typically have enough knowledge or experience to be able to determine if it is more cost efficient to shed loads to reduce the consumption of energy at a plant, to maintain loads or to reconnect loads so as to run the plant at optimum loading for production purposes or to create more energy than is currently needed and to sell that energy to a third party, such as to the power grid. In fact, in many cases, it may actually be more efficient for a particular plant to stop production and to instead use the plant equipment to create energy and sell this energy to a third party via the power grid.

As will be understood, there are many factors to consider when optimizing (e.g., minimizing) the costs of energy creation and usage in a particular industrial, municipal or residential plant, including the forms of energy (electrical, steam, etc.) that can be or that need to be created at any particular time, the amount of energy in each of these forms that needs to be used to run plant equipment at various operational levels, the operational levels at which the components of the plant need to be run at any particular time to meet the business purposes of the plant, the costs of the raw materials needed to create and/or store energy at the plant, the cost of the energy purchased from the power grid or other third parties, whether there is an ability to store energy at the plant for later use or sale, the energy efficiencies of the plant equipment (including any energy storage equipment), etc. Energy optimization is further complicated by the fact that the plant needs and the energy costs can change drastically over short periods of time and that forecasting energy costs is thus a necessary part of any energy management system that attempts to minimize or otherwise optimize energy costs over time. Because these factors are constantly fluctuating, plant operators quickly lose the ability to make the complicated and very involved calculations needed to determine the set of plant operational conditions that optimizes the costs/profits of the plant taking energy usage into account within the plant. Thus, while plant operators can make gross changes to the operational parameters of a plant in an to attempt to reduce the energy costs of the plant, operators really cannot determine the best manner of running a plant over time to minimize energy costs using current energy managements systems, as it is almost impossible to manually calculate or determine the most optimal manner of running the plant at any particular time, much less over a time period extending into the future.

SUMMARY OF THE DISCLOSURE

An energy management system uses an expert engine and a numerical solver to determine an optimal manner of using and controlling the various energy consumption, producing and storage equipment in a plant in order to reduce or optimize energy costs within the plant, and is especially applicable to plants that require or that are capable of using and/or producing different types of energy at different times. More particularly, an energy management system operates the various energy manufacturing and energy usage components of a plant to minimize the cost of energy over time, or at various different times, while still meeting certain constraints or requirements within the operational system, such as producing a certain amount of heat or cooling, a certain power level, a certain level of production, etc. In some cases, the energy management system may cause the operational equipment of the plant to produce unneeded energy that can be stored until a later time and then used, or that can be sold back to a public utility, for example, so as to reduce the overall cost of energy within the plant or the maximize profits within the plant.

In one embodiment, a configuration system is adapted to be used to configure the operation of a plant having a set of interconnected plant equipment, wherein the plant equipment includes multiple sets of energy production units that can be run separately or together to produce energy. The configuration system includes a computer readable memory that stores a plurality of equipment models (also referred to herein as plant models) that model the operation of the plant equipment and an objective function that defines optimal operation of the interconnected plant equipment. The configuration system also includes a numerical solver that operates on a computer processing device using the objective function, the plurality of equipment models and a set of plant configuration input criteria to determine an optimal operating configuration of the set of interconnected plant equipment by determining an operational configuration of the set of interconnected plant equipment that minimizes or maximizes the objective function. Moreover, the configuration system includes an expert engine (also referred to as an expert system) that operates on a computer processing device to determine one or more operating values for use in running the plant equipment, wherein the expert engine calls the numerical solver a plurality of times to determine the one or more operating values for use in running the plant equipment, and wherein the expert engine provides the numerical solver a different set of plant configuration input criteria during each of the calls.

If desired, the objective function may be selected to determine an economic cost of running the energy production units to produce a needed amount of energy. Moreover, the computer readable memory may store first and second different equipment models for one or more of the energy production units, wherein the numerical solver uses the first equipment model for the one or more of the energy production units during a first call from the expert engine and uses the second equipment model for the one or more energy production units during a second call from the expert engine. If desired, the first equipment model for the one or more energy production units may be less accurate but less computationally expensive than the second equipment model for the one or more energy production units. Alternatively or in addition, the first equipment model for the one or more energy production units may be less constrained than the second equipment model for the one or more energy production units.

The expert engine may provide a first set of operational constraints to the numerical solver as the plant configuration input criteria for one or more pieces of the plant equipment during the first call to the numerical solver and may provide a second set of operational constraints to the numerical solver as the plant configuration input criteria during the second call to the numerical solver, wherein the second set of operational constraints are less relaxed than the first set of operational constraints. Likewise, the expert engine may provide a set of ambient conditions, plant equipment operating costs, energy demands and equipment constraints to the numerical solver as the plant configuration input criteria during each of a first call and a second call to the numerical solver. In this case, the expert engine may provide the same set of ambient conditions, plant equipment operating costs, and energy demands as the plant configuration input criteria during each of the first call and the second call to the numerical solver but may provide a different set of equipment constraints to the numerical solver during the first call and the second call to the numerical solver. In another case, the expert engine may provide the same set of ambient conditions, plant equipment operating costs, and energy demands as the plant configuration input criteria during each of the first call and the second call to the numerical solver but may provide a subset of equipment to use as constraints to the numerical solver during the second call to the numerical solver.

In still another embodiment, the numerical solver may use the objective function to determine an optimal set of plant equipment to use during a first call to the numerical solver and the expert engine may provide the optimal set of plant equipment to the numerical solver in a second call to the numerical solver. Thereafter, the numerical solver uses the objective function to determine an optimal set of equipment operational parameters for the optimal set of plant equipment during the second call to the numerical solver. Likewise, the numerical solver may use a first set of equipment models during the first call from the expert engine and may use a second and different set of equipment models during the second call from the expert engine, wherein the second set of equipment models are more accurate than the first set of equipment models. Additionally, the numerical solver may use a first set of operational constraints in response to the first call from the expert engine and may use a second and different set of operational constraints during the second call from the expert engine, wherein the second set of operational constraints are less relaxed than the first set of operational constraints.

Still further, the expert engine may provide ambient conditions, plant operating costs, and plant demands as the plant configuration input criteria during a first call to the numerical solver and the numeral solver may then determine an optimal set of the plant equipment to use to meet the plant demands based on the objective function during the first call to the numerical solver. Thereafter, the expert engine may provide ambient conditions, plant operating costs, and plant demands and an indication of the optimal set of plant equipment to use to meet the plant demands during a second call of the numerical solver. The numerical solver then determines a set of optimal operational settings for the optimal set of plant equipment during the second call to the numerical solver. Of course, the numerical solver may use different equipment models for the same plant equipment during the first and second calls to the numerical solver and/or the numerical solver may use different sets of equipment operational constraints during the first and second calls to the numerical solver.

In some instances, the objective function has parameters that consider costs of energy creation and usage of the plurality of energy production units associated with operational configurations of the energy production units and the expert engine uses an output of numerical solver from a first call to the numerical solver to determine one or more of the plant configuration input criteria for use in a second call to the numerical solver. Still further, the numerical solver may receive a set of constraints associated with operating limits of plant equipment including each of the energy production units, and the numerical solver may determine different operational configurations of the energy production units as plant operating points that do not violate any of the set of constraints.

In another embodiment, an energy management system for use in operating a plant having a plurality of energy producing units coupled to one or more loads includes an expert engine and a numerical solver. The expert engine operates on a computer processing device to determine different sets of input plant operating configuration criteria for operating the energy producing units, wherein the expert engine uses the different sets of input plant operating configuration criteria to determine a final optimal operating configuration of the plurality of energy producing units. Moreover, the numerical solver, which is coupled to the expert engine, includes an objective function and a set of equipment models for the energy producing units. The numerical solver operates on a computer processing device to determine an optimal plant operating configuration by modeling the plant operation at a number of different operating configurations based on a particular set of input plant operating configuration criteria and determining one of the number of different operating configurations that best meets the objective function. In this case, the objective function considers costs of energy creation and usage of the plurality of energy producing units. Still further, during operation, the expert engine calls the numerical solver multiple times, provides the numerical logic solver with a different set of input plant operating configuration criteria during each call of the numerical solver and determines the final optimal operating configuration of the plurality of energy producing units based on the optimal plant operating configurations determined by the numerical solver during the calls.

In a still further embodiment, a method of configuring the operation of a plant having a set of interconnected plant equipment that includes multiple sets of energy production units that can be run separately or together to produce energy includes storing on a computer device a plurality of equipment models that model the operation of the plant equipment and an objective function defining optimal operation of the interconnected plant equipment. The method also determines one or more operating values for use in running the plant equipment by calling, via a computer device, a numerical solver a plurality of times to determine one or more operating values for use in running the plant equipment, including providing the numerical solver different plant configuration input criteria during each of the calls. Moreover, during each of the calls, the method uses the objective function, the plurality of equipment models and a set of plant configuration input criteria to determine an optimal operating configuration of the set of interconnected plant equipment by determining an operational configuration of the set of interconnected plant equipment that minimizes or maximizes the objective function.

DETAILED DESCRIPTION

With electricity being more of a major component in the cost of manufacturing, load shedding or, more generally, load management, can be used in industrial plants or other types of plants for more than just making sure plant operation equipment and frequency is maintained. Instead, load shedding, in combination with load restoration, can be used to manage the electricity and other energy costs of the plant in a manner that minimizes or otherwise optimizes energy costs within the plant, thereby making the plant operate in a more profitable manner. In particular, an energy management system as described herein may be used to control a plant or to advise a plant/community operator as to which loads (equipment) to connect or to operate at any particular time, when to shed loads because operation of these loads would be unprofitable or less profitable at that time, when loads should be restored, which loads should be restored first when bringing loads back on-line, etc., all to minimize energy costs, maximize profits or to fulfill some other optimization criteria taking energy costs into account. In certain circumstances, the energy management system described herein can be configured so that its recommendations are automatically implemented via one or more controllers.

The energy management system described herein can also be used to aid in forecasting the expected energy costs (within a production horizon for example) and the needed energy demand for an industrial, municipal or other type of process or plant. For example, many plants/communities have chilled water demands. If the weather forecast indicates that chilled water will be in high demand, the energy management system can run the chillers during off peak hours and the chilled water can be stored in thermal storage tanks for use during the on peak hours when power prices are typically higher. Of course, this is only one example of the manner in which the energy management system described in detail herein can be used to optimize plant operation by, for example, minimizing energy costs at the plant. Moreover, the concepts discussed herein apply not only to industrial processes, but can additionally be applied to municipal uses, such as municipal electric or water companies, to enable these types of plants to control their energy bills and to negotiate better electrical contracts. The energy management system described herein is furthermore scalable down to an individual power user as more advanced power generation and storage technology, such as electrical fuel cells with micro-turbine generation, becomes available. In fact, decentralized power production development will create a need for a greater number of decisions to be made in determining the best manner of purchasing and/or producing energy at an industrial plant, hotel, residence, etc., when measured against the associated prices and costs of the various forms of energy production available to the plant, hotel, residence, etc.

Figure 1:
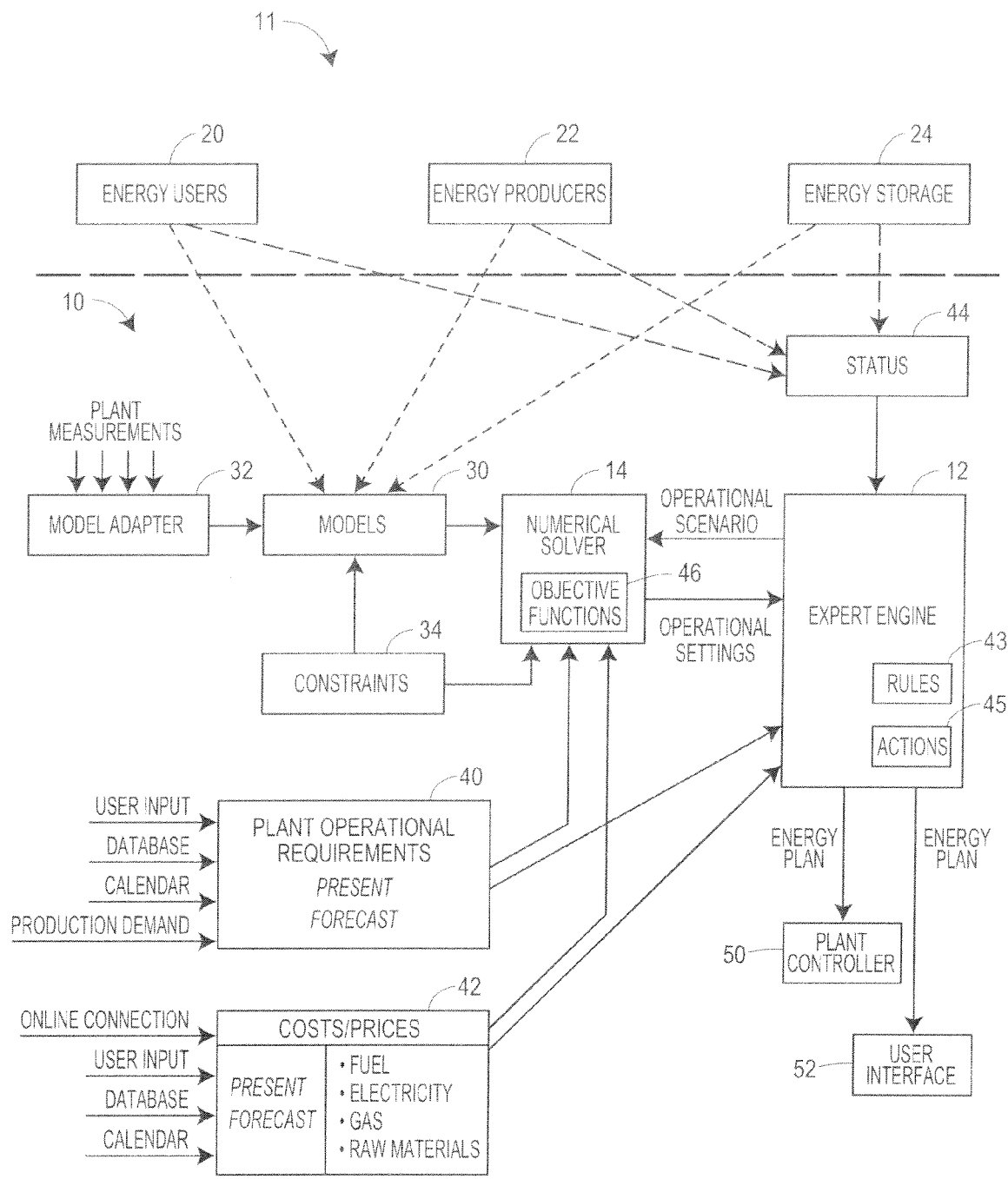
FIG. 1 illustrates a block diagram of an energy management system that can be used in various types of plants to optimize plant operation taking into account the production, storage and use of energy within the plant.

FIG. 1 illustrates a generalized block diagram of an example energy management system 10 used in conjunction with a plant 11. The energy management system 10 generally includes an expert engine 12 and a numerical solver 14 (also called a numerical solver or an optimizer) that communicate with one another in order to determine a plant operational condition (to be used in a particular industrial, municipal, power generation or residential plant environment) that optimizes energy, costs by, for example, minimizing the costs of energy in the plant, maximizing the profits of the plant, etc. This optimal operating condition may, for example, detail what plant equipment (loads) to run or to connect at any particular time, and/or may specify other plant operational criteria, such as the operational parameters or settings of particular loads or plant equipment (e.g., what speeds to run fans or other equipment, the production level of plant equipment, etc.) Thus, in one simple example, the energy management system 10 may use the expert system 12 and the numerical solver 14 to decide which loads to shed or to restore at any particular time, the order in which to shed or restore loads, etc.

Blocks 20, 22 and 24 of FIG. 1 generally indicate various different types of equipment associated with the plant 11 in which the energy management system 10 is to be used, including energy users 20, energy producing systems 22 and energy storage systems 24. The energy users 20 may include any plant equipment that uses energy in any form, including electrical energy, steam or heat energy, hot water, etc. Generally, the energy users 20 will include industrial plant production systems of all kinds, steam powered systems used for heating or providing other utilities, electrical powered systems used to run pumps, lights, air conditioners, motors, etc., or any other plant equipment that requires the use of energy in one form or another.

The energy producing systems 22 include any type of plant equipment that produces energy by, for example, converting energy from one form to another. This type of equipment may include, for example, electrical generating equipment of any kind, steam generating equipment, etc. More particularly, the energy producing systems 22 may include any known types of energy production equipment including, for example, gas powered electrical generators, steam powered turbines, natural gas powered generators, fuel oil generators, nuclear power systems, solar energy collection systems, wind powered electrical generation systems, or any other kind of energy generators that produce energy or power in one form or another or that convert energy from one form to another form. The energy producing systems 22 might start with raw materials such as natural gas, fuel oil, power from the electrical grid, etc. and produce energy in another form, or alter the state of energy from one state, such as natural gas, to another state such as heat or steam. The output of the energy producers 22 may be used to power the energy users 20, may be sold to a third party such as in the form of electrical energy to the power grid, or may be provided to and stored within the energy storage systems 24.

The energy storage systems 24, if there are any, may include any types of energy storage equipment such as fluid (e.g., water) chillers, heat retention systems, batteries, or other equipment that stores energy produced by the energy producers 24, energy from the power grid, etc. The energy storage systems 24 may, at any desired time, provide stored energy to, for example, one of the energy users 20, back to the power grid, etc.

Of course, the particular equipment that exists in a plant will vary depending upon the type of plant or system in which the energy management system 10 is used. The plant could, for example, be an industrial plant that produces or manufactures one or more products, a processing plant that processes materials, a power generation plant of any kind, a municipal plant such as a municipal water processing plant, a sewage processing plant, etc. Still further, the plant could be a residential plant of some kind, such as a college campus power plant, a hotel, a condominium or an apartment building power plant, or even an individual house, condominium or other residence. Generally speaking, many of these types of plants include steam production equipment necessary for running steam turbines, electricity generation equipment needed for running pumps, and energy storage systems, in addition to equipment that runs on electricity delivered from the public power grid. For example, many residential or campus plants typically include boiler or steam systems used for heating purposes, electrical generation systems used for lighting and cooling, natural gas systems that produce hot air, etc., in addition to equipment that uses electrical energy from a public power grid.

As illustrated by the dotted lines in FIG. 1, the energy management system 10 includes a set of stored equipment or process models 30 which model, simulate or otherwise describe the operation of each of the energy users 20, the energy producers 22 and the energy storage systems 24 within the plant 11. The models 30 can take the form of any type of equipment or process models, such as first-principle models, statistical models, or any other types of models that may be used to model the equipment associated with the energy users 20, the energy producers 22 and the energy storage systems 24 within the plant 11. The models 30 are connected to and are used by the numerical solver 14, as will be described in more detail below, to enable the numerical solver 14 to determine an optimal operating point or setting of the plant 11 with respect to energy usage.

More particularly, the models 30 may be equipment models that model the plant 11, parts of the plant 11 and/or particular plant equipment. Generally speaking, the equipment models 30 allow the numerical solver 14 to predict or estimate the operation of the plant 11, or a portion of the plant 11 such as the boiler sections, the steam cycles, etc. of the plant 11, in response to various different control inputs or at various different plant operating points. The equipment models 30 can include separate models for different pieces of plant equipment or aggregate models of equipment, and the models 30 can be component models, unit models, and/or loop models that model the reaction or operation of one or more individual pieces or groups of equipment within the plant 11. The models 30 can be any suitable type of mathematical models, including immunological based models, neural network based models, statistical models, regression models, model predictive models, first order principle models, linear or non-linear models, etc.

If desired, an adaptive intelligence block 32 may implement a routine that receives feedback from the equipment within the plant 11, including the energy users 20, the energy producers 22 and the energy storage systems 24, and that operates to adapt or change the models 30 to more accurately reflect the actual or current operation of this equipment based on measured outputs or other feedback from the plant equipment. Generally speaking, the adaptive intelligence block 32 may use any applicable adaptive modeling techniques to change or alter the models 30 so as to make the models 30 more accurate based on the measured or actual operation of the plant equipment.

Still further, the energy management system 10 includes a stored set of constraints 34 that may be created and stored for each of the models 30, the constraints 34 indicating the limitations to which each of the energy users 20, the energy producers 22 or the energy storage units 24 might be subject. The constraints 34 may change over time based on the adaptive modeling block 32, based on user input (which might be made to reflect desired operational limits of particular equipment), or based on any other criteria, such as to reflect the removal equipment for servicing, etc. Generally speaking, the constraints 34 indicate the physical limitations of the plant equipment and are used by the numerical solver 14 to determine the most optimal setting of the plant equipment within the physical limitations of this equipment.

The energy management system 10 also includes or receives a set of operational requirements 40 that the plant 11 in general, or that particular equipment within the plant 11, may be subject to at any particular time, including at the current or present time as well as at times in the future. Thus, the requirements 40 may express one or more current demands or requirements and/or forecasts of future demands or requirements for the plant. The operational requirements might, for example, express the necessary power or forms of power that must be delivered within the plant 11 based on preset or pre-established usage or operational requirements for the plant equipment. For example, the requirements 40 may indicate the amount of steam that must be produced, the amount of heating or air conditioning that must be produced or the amount of electricity that must be provided at any particular time to keep the plant 11 operational at a desired level of operation. A forecast of these requirements may include a forecast of the desired or needed output of the plant 11 over time, and of course these forecasts might change over time. If desired, the plant operational requirements 40 may be in the form or ranges so that the energy management system 10 may determine an optimal set of plant requirements, within one or more allowed ranges, that might result in the most optimal setting of the plant 11. For example, the operational requirements might take the form of the minimum or maximum amount of heating and/or air conditioning that is needed at different times during a week or during a month at a college campus, the amount (or range) of steam, electricity, or other form of power that must be available during a particular hour, day, week, month, etc. to meet plant operational needs, etc. Of course, the plant needs or requirements 40 might change over time, and these requirements can be expressed as a forecast of needs at future times. In some cases, the operational requirements 40 may indicate the highest and/or lowest usage levels at which the plant 11 or particular equipment within the plant 11 can be set at various times, and these requirements 40 enable the energy management system 10 to determine the best most optimal operational settings of the plant equipment over time to manage energy usage in the plant 11 more efficiently. Of course, the operational requirements 40 can be established by user inputs, can come from a stored database that might be changed by a user, can be set by the expert system 12, can be based on previous usages in the plant 11, can be based on a demand signal or a demand curve associated with a production schedule (e.g., developed in a business system associated with the plant 11), or can be set in any other manner. In one embodiment, some of the requirements might come from a calendar, such as computer calendar (e.g., an Outlook® calendar) associated with the personal calendaring system, a business production system, etc. Such a calendar may be communicatively tied to the energy management system 10 and indicate plant usages or events over time that might need to be considered when scheduling optimal plant production or operation.

The energy management system 10 also includes a block 42 that stores or provides access to a set of energy costs and/or prices. The energy costs and/or prices within the block 42 can include the costs and prices associated with the purchase or sale of raw materials, such as natural gas, fuel oil, etc. to be used in the plant 11, the cost of electricity from the power grid if used in the plant 11, or any other costs of energy used in the plant 11. Moreover, these costs and prices may indicate the price paid by third parties for energy produced in the plant 11, such as the price to be paid to the plant 11 for electrical energy provided to the power grid, the price to be paid for steam delivered to a third party, etc. In some cases, such as in an industrial or manufacturing plant, the costs and prices in the block 42 may include the costs of other raw materials used to produce a product in the plant 11, as well as the price paid for the product being output or produced at the plant 11. These costs and prices enable the energy management system 10 to determine, for example, the profit of the plant 11 at any particular plant operational setting taking into account energy usage and production costs, as well as the income generated by the sale of plant outputs. Of course, the costs and prices in the block 42 may express the costs and prices at the current time, and/or may be a forecast of costs and prices for each of the energy factors, raw materials, plant outputs, etc. over some period of time into the future, i.e., over a prediction or forecast horizon. As examples only, the block 42 may store the current price at which energy in the form of electricity can be sold, if such is possible within the plant environment, the cost of energy from the power grid, the current cost of natural gas (used to operate the plant equipment) being delivered from the natural gas suppler, the costs of fuel oil and other raw materials previously purchased and stored at the plant 11 for use by the plant equipment, etc. The block 42 may also include prices being paid for electricity or other energy (e.g., steam) that can be sold to third parties via, for example, the power grid. The costs and prices stored in the block 42 may include present energy related costs and prices as well as forecasted future energy related costs and prices. Of course, the block 42 may obtain the energy costs and prices on-line or in real time from the various suppliers of the energy (e.g., from the public utility provider, the natural gas provider, etc.), may obtain information from a database that stores the actual costs to the plant for various raw materials that have been purchased and stored in storage tanks, etc., may obtain cost and price information directly from a user or a user interface, may obtain cost and price information stored in any other database and even may obtain information from business systems such as a business calendar or other computer system in which a plant operator or other personnel could input the cost and/or price information.

As illustrated in FIG. 1, the expert engine 12 stores a set of rules 43 and a set of actions 45 which might be any type of rules and actions that the expert engine 12 uses to determine different possible operational scenarios that might be implemented in the plant 11 taking into account the requirements of the plant 11, the costs of the energy, etc., to determine an operational setting of the plant that is optimal (or at least locally optimal) from an energy usage or production standpoint. The rules 43 may be used to determine the best or an optimal plant setting at the current time, or might determine the manner in which the plant 11 should be run over a time horizon so as to minimize energy costs or maximize profits of the plant 11 taking energy costs into account. The actions 45 are functions that may be implemented or taken in response to the determination of the optimal operating point or configuration determined by the numerical solver or in providing potential plant scenarios to the numerical solver for evaluation. These actions may include, for example, procedures or constraints used to perform load shedding and load establishment (such as the order in which to perform these activities on particular sets of equipment) within the interconnected processes. These procedures or other actions may to be used by or delivered to plant controllers or user interfaces associated with the energy management system 10.

Generally speaking, in one embodiment, the expert engine 12 operates to develop one or more general or specific plant operational scenarios using the stored rules 43 and provides these plant operational scenarios to the numerical solver 14. The numerical solver 14 then uses the models 30, the constraints 34, the operational requirements 40, the costs 42, as well as any data from the expert engine 12 indicative of, for example, other operational requirements or limits, to determine an overall cost of the energy used in the scenario or to determine an optimal plant operational setting that, for example, maximizes plant profits. In the later case, the numerical solver may use an objective function 46 stored therein or associated therewith to determine the optimal plant setting. In some cases, the numerical solver 14 may modify constraints, limits or other factors associated with the plant operational scenario to determine, within a range provided by, for example, the expert system 12, the particular set of operational parameters that minimizes or maximizes the objective function 46. Of course, the numerical solver 14 may use any desired or applicable objective function 46, and this objective function 46 may be changed or selected by the user if so desired. Generally speaking, however, the objective function 46 will be designed to reduce the overall cost of energy use in the plant 11, to maximize profits in the plant 11 taking into account the energy usage and costs of the plant, etc.

The numerical solver 14 returns an energy cost (for a particular operational scenario) or an optimal plant setting as determined using the objective function 46 to the expert engine 12 which may then compare the returned energy cost to other scenarios considered by the expert engine 12 (and potentially analyzed by the numerical solver 14) to determine the best or most optimal plant operational scenario that, for example, minimizes energy costs, maximizes profits considering energy costs of the plant 11, etc. Of course, the expert engine 12 can provide any number of general plant operational scenarios to the numerical solver 14 (such as those that include storing energy over time, that consider a specific time period into the future over which to reduce energy costs, etc.) to determine an optimal operating point or plan (over time) of the plant 11 with respect to energy creation, usage and storage. Thus, the expert engine 12 might, for example, determine the optimal operating point of the plant 11 at the current time based on current prices and plant requirements and may, for example, determine that one or more loads or plant equipment should be shed or restored to optimize plant operation. That is, in this case, the expert engine 12 may determine that it is best to shut down the plant, or some portion of the plant equipment in order to optimize the plant, and may later determine that is economical to restore plant equipment or loads within the plant. In this case, the expert engine 12 may store or determine, using the rules 43, the order in which plant equipment should be shed or restored for optimal energy efficiency or usage within the plant. In another case, the expert engine 12 may determine a manner of running the plant 11 over a particular period of time (time horizon) that minimizes energy costs, maximizes profits associated with plant production, etc.

As illustrated in FIG. 1, a block 44 may track and store the status of each of the energy users 20, the energy producers 22 and energy storage systems 24 and may provide this status information to the expert engine 12, which can use this information to determine the plant operational scenarios to be considered or analyzed by the numerical solver 14 or to determine the particular equipment to use when implementing a production or operational schedule determined by the numerical solver 14 to be optimal in some manner. For example, if some of the energy producers 22 or energy storage systems 24 are not functional, or are functional only at a minimal level, the expert engine 12 can prevent the numerical solver 14 from considering or using those systems in its calculations as part of a particular energy management scenario. In some cases, the expert engine 12 may choose to run other equipment when implementing a production or operational schedule developed by the numerical solver 14 that calls for the use of a subset of the plant equipment. Of course, the expert engine 12 may operate to alter the energy management scenarios provided to the numerical solver 14 in any manner based on status of plant equipment.

Thus, as will be understood, the expert engine 12 uses the numerical solver 14 to develop an optimal energy usage plan at the present time or over a particular forecasted time into the future. Such a scenario might include configuring the plant to produce energy or run particular equipment within the plant at the current time, because it is cheaper to do on as compared to a time in the future when energy prices are forecasted to higher, when the weather may be such that more energy will be required for the same amount of production, etc. Alternatively, the expert engine 12 may consider and develop a plant production plan that produces energy at the current time, that stores the produced energy in one or more of the energy storage units 24, and that uses the stored energy at a later time when the energy production costs are higher, all in an attempt to reduce the overall costs of operating plant equipment over a particular period of time while still satisfying or meeting the operational requirements of the plant 11, such as those mandated by the block 40.

Once the expert engine 12 and/or the numerical solver 14 develops a plant operational schedule specifying the equipment within the plant 11 to run at any particular time, the operational setting of this equipment, etc., the expert engine 12 may provide that schedule to one or more plant controllers 50 and/or to a user interface 52. The plant controllers 50 may automatically implement the operational schedule for the plant 11, by controlling the plant equipment (e.g., the energy users 20, the energy producers 22 and the energy storage systems 24) to run according to the schedule. This control may involve performing load shedding and load restoring at various times based on the output of the expert engine 12, may involve changing or altering the operational settings of various plant equipment over time, etc. Alternatively or in addition, the operational schedule may be provided to the user interface 52 for viewing by an operator or other user, who may decide to implement (or not implement) the schedule manually or who may authorize the schedule to be implemented in an automatic manner by the process controllers 50.

As will be understood, the numerical solver 14 can be any desired or applicable type of optimizer, numerical solver, etc. that, in one embodiment, uses the stored objective function 46 to determine which of various different possible operating points of the plant 11 is optimal from an energy usage or cost standpoint based on current conditions within the plant 11, constraints associated with the plant 11 and the models 30 of the plant 11. The numerical solver 14 receives the set of plant or equipment constraints 34 which specify different constraints or limits within which the numerical solver 14 must operate (e.g., limits or constraints which the numerical solver 14 cannot violate when determining an optimal plant operating point based on the objective function 46 being used). These constraints may include any limits, ranges, or preferred operating points associated with any equipment or process variables within the plant 11 and can be specified by a user, an operator, a plant designer, equipment manufacturer, etc. These constraints may include, for example, limits or ranges associated with water levels within the plant 11, steam and water temperatures, steam pressures, fuel flow, steam flow, water flow, and other operating ranges or set points to be used in the plant 11. The constraints 34 may also specify or identify particular equipment which may be available or not available at any particular time to be used in the plant 11. For example, different ones of power equipment boilers, turbines, fans, air condenser units etc. may not be available for use at a particular time, because these units may be out of service, may be under repair, etc. In this case, the constraints 34 may include or be in the form of a maintenance schedule specifying when particular pieces of plant equipment are being serviced, repaired or otherwise planned to be out of commission, thereby specifying when these units can and cannot be used. Moreover, the constraints 34 may include an indication of which units or equipment within the plant 11 are in or are out of service and the allowable operating ranges or parameters of equipment within the plant 11.

Some of the operating constraints 34 may be indicative of or affected by current conditions in the plant 11 and the current conditions may also be provided as operating constraints to the numerical solver 14 by the block 34 or by the expert system 12. The current plant conditions, which may be measured or sensed in the plant or may be input by a user or operator, may include, for example, the current load demand on the plant or a portion of the plant (e.g., the power or other load to be produced by the plant 11 or a particular piece or unit of equipment within the plant 11), the ambient temperature, the relevant ambient humidity, forecasts of load demand and environmental conditions for the future, etc. In some cases, the load demand can be specified as either or both of the real power (Megawatts) and reactive power (MVAR) to be delivered by the plant 11 or a section of the plant 11. However, if desired, the load demand could be specified as other types of loads, such as turbine power demand, process steam demand, hot water demand, etc.

Generally speaking, during operation, the numerical solver 14 uses the equipment models 30 to simulate or model the operation of the plant 11 at various different operating points while operating under the current or forecasted environmental conditions and within the current or forecasted constraints 34. The numerical solver 14 then calculates or solves the objective function 46 for each of these operating points to determine which operating point is most "optimal" by minimizing (or maximizing) the objective function 46. The specifics of the operating point (e.g., set points, fuel burn rates, number and speed of the fans to run, etc.) associated with the optimal operating point are then provided to the expert system 12. Of course, the numerical solver 14 may perform the optimization calculations for the current time and for any number of times in the future, to thereby provide a trajectory of operating points to be reached in view of known future changes in the load demand, expected environmental condition changes, maintenance activities which will take plant equipment off line or put plant equipment back on line, etc.

While the objective function 46 can be any type or desired function defining a method for determining an optimal operating point of the plant 11, in a typical situation, the objective function 46 will determine an achievable operational point of the plant 11 that satisfies the current load demand of the plant 11 at the current environmental conditions, at the least or minimal energy cost, taking into account all or most of the variable costs in running the plant 11 and, if desired, taking into account any income made or expected to be made from outputs of the plant 11. These variable costs may include, for example, the cost of the fuel needed in the boilers of a power plant, the cost of running pumps within the re-circulating systems of the plant, the cost of running the fans of the air cooled condensers of the plant 11, etc. During the optimization calculations, the numerical solver 14 may model or simulate the operation of the plant 11 (using the equipment models 30) to determine the optimal fuel and air mixture or burn rates, the optimal speed of the fans or pumps, the optimal usage of fans or other equipment within the plant by determining the particular combination of these and other process variables that, for example, minimizes or reduces the objective function 46 while still obtaining the desired load. Of course, the numerical solver 14 may determine an "optimal operating point" by modeling various different combinations of the relevant process or plant variables using, for example, an iterative process, and computing the objective function 46 for each modeled combination to determine which combination (or operating point) results in minimizing (or maximizing) the objective function 46 while still allowing plant operation that meets the load demands at the relevant environmental conditions without violating any of the operating constraints 34. Thus, the numerical solver 14 may select a fuel burn rate or fuel/air mixture to achieve a desired power output at the current environmental conditions and determine the minimal number of equipment or the type of equipment, or the combination of different types of equipment that result in the minimal cost of power, while still allowing the plant 11 to generate the load demand at the current or future environmental conditions without violating any of the operating constraints 34. The numerical solver 14 may then apply the objective function 46 to this operating point to determine an objective function value for this operating point. The numerical solver 14 may then change setting or combinations of equipment within the plant 11 by, for example, increasing or decreasing the use or rates of particular equipment, etc. and again determining the plant operational configuration to use to obtain the desired load under the relevant environmental conditions and operating constraints 34. The numerical solver 14 may then apply the objective function 46 to this operating point and determine the objective function value for this operating point. The numerical solver 14 may continue to make changes to the modeled operating points by, for example, iteratively varying the equipment usage and running parameter combinations, (such as fuel burns, fuel/air mixtures, turning equipment on or off, etc.) and evaluating each of these operating points using the objective function 46 to deter wine which operating point results in the minimum (or maximum) objective function value. The numerical solver 14 may select the operating point that minimizes or maximizes the objective function 46 as the optimal operating point for delivery to the expert system 12.

Here it will be noted that the numerical solver 14 may use any desired routine, such as an iterative routine, to select various different operating points for simulation for possible use as an actual optimal plant operating point. The numerical solver 14 may, for example, use the results of previous simulations to direct the manner in which various variables are changed to select new operating points. In most cases, however, the numerical solver 14 will not model or consider every possible plant operating point because the multi-dimensional space created by the number of process variables that can be changed results in too many potential operating points to be practically considered or tested. Thus, selecting an optimal operating point, as used in this discussion, includes selecting a local optimal operating point (e.g., one that is optimal in a local region of operating points of the plant 11), and includes selecting one of a set of simulated operating points that minimizes or maximizes the objective function 46 without regard to non-considered operating points. In other words, selecting or determining an optimal operating point as used herein is not limited to selecting the operating point which minimizes or maximizes the objective function 46 across the entire multi-dimensional operating space of the plant, although in some cases this may be possible.

If desired, the numerical solver 14 may implement a least-squares technique, a linear programming (LP) technique, a regression technique, a mixed integer linear programming technique, a mixed integer non-linear programming technique or any other known type of analysis to find the achievable operating point of the plant 11 that minimizes (or maximizes) the objective function 46, given the current conditions, the constraints 34 and the load requirements or operational requirements 40 provided to the numerical solver 14. In one example, the numerical solver 14 is a linear programming (LP) optimizer that uses the objective function 46 to perform process optimization. Alternatively, the numerical solver 14 could be a quadratic programming optimizer which is an optimizer with a linear model and a quadratic objective function. Generally speaking, the objective function 46 will specify costs or profits associated with each of a number of manipulated variables (which are referred to generally as process or plant variables) and the numerical solver 14 determines target values for those variables by finding a set of plant variable values that maximize or minimize the objective function 46 while operating within the constraints 34. The numerical solver 14 may store a set of different possible objective functions (each of which mathematically represents a different manner of defining the "optimal" operation of the plant 11) for potential use as the objective function 46, and may use one of the stored objective functions as the objective function 46 used during operation of the numerical solver 14 based on, for example, user input. For example, one of the pre-stored objective functions 46 may be configured to reduce the cost of operating the plant 11, another one of the pre-stored objective functions 46 may be configured to minimize the creation of undesirable pollutants or gases within the plant 11 at the lowest possible cost of operation, while a still further one of the pre-stored objective functions 46 may be configured to maximize plant profits, taking into account the energy costs of the plant 11.

A user or an operator may select one of the objective functions 46 by providing an indication of the objective function to be used on the operator or user terminal 52, which selection is then provided to the numerical solver 14. Of course, the user or operator can change the objective function 46 being used during operation of the plant 11 or during operation of the energy management system 10. If desired, a default objective function may be used in cases in which the user does not provide or select an objective function.

As noted a above, during operation, the numerical solver 14 may use a linear programming (LP) or non-linear programming (NLP) technique to perform optimization. As is known, linear programming is a mathematical technique for solving a set of linear equations and inequalities that maximizes or minimizes the objective function 46. Of course, the objective function 46 may express economic values like cost or profit but may express other objectives instead of or in addition to economic objectives. Using any known or standard LP algorithm or technique, the numerical solver 46 generally iterates to determine a set of target manipulated plant variables which maximize or minimize the selected objective function 46 while resulting, if possible, in plant operation that meets or falls within the constraints and while producing the required or desired load, output power, process steam, etc.

Once the numerical solver 14 determines an optimal operating point of the plant 11, the expert system 12 can assess the feasibility of this operating point from a safety and implementation standpoint and may modify this solution or further define this solution if needed based on the set of rules 43 stored in or as part of the expert system 12. In some cases, the expert system 12 may store rules 43 that examine the solution provided by the numerical solver 14 to make sure implementation of this solution does not result in an unsafe condition, either for humans in or around the plant 11 or for equipment within the plant 11. The expert engine 12 may also store rules 43 that help the expert engine 12 to specify particular equipment to use to implement the solution provided by the numerical solver 14. For example, the expert engine 12 may specify which particular boilers, turbines, etc. to use to run at a particular time to implement the solution specified by the numerical solver 14. The expert engine 12 may, for example, determine which equipment to use based on which of the units are in service at the particular time (thus preventing a plant controller from trying to use a piece of equipment that is being serviced or that is out of commission). The expert engine 12 may also specify the use of particular equipment to prevent excessive wear on or overuse of one or more of those pieces of equipment to thereby extend the life of the plant equipment. Thus, the expert engine 12 may, over time, try to average out which particular pieces of equipment are being used to thereby prevent one piece of equipment (such a one turbine) from sitting idle all of the time (which is not good for the turbine) and/or another turbine from being used all of the time (which is also not good for the turbine). In this case, the expert engine 12 may prevent the numerical solver 14 from using the best turbine (i.e., the most efficient turbine) all of the time, which would result in overuse of that turbine, while also assuring that the worst turbine (i.e., the least efficient turbine) is run at some minimum level or frequency. The expert engine 12 may also track usage of the plant equipment and track the scheduled service for the plant equipment, and may force the plant controller to use particular equipment which is scheduled to be serviced in the near future at a heavier load so as to maximize the usage of that equipment prior to the servicing or repair activity.

Additionally, the expert engine 12 may force additional conditions on the plant 11 not considered by the numerical solver 14. For example, in some cases, the expert engine 12 may cause some or all of the equipment to run at a minimal level or at various levels to protect that equipment (e.g., when freezing weather is present at the plant 11), even though the numerical solver 14 specifies that, for example, only one half of the equipment should be used in the optimal solution.

In addition to modifying the outputs of the numerical solver 14, the expert engine 12 may add or specify constraints 34 to be considered by the numerical solver 14 in determining an optimal operating point of the plant 11. For example, the expert engine 12 may specify a reduced number of turbines, boilers, etc. that can be used in any solution provided by the numerical solver 14 because the expert engine 12 knows that a certain number of these units are out of order or are being serviced, to preserve the life of some of the units which have been heavily used for a period of time, etc. In the same manner, the expert engine 12 may limit the speed at which one or more of the plant equipment is run in certain circumstances, may specify a minimum speed at which equipment needs to be run, etc. Of course, the expert engine 12 can provide and modify any number of different constraints 34 to be used by the numerical solver 14, so as to direct the solution provided by the numerical solver 14 to meet criteria or initiatives that are being implemented by the expert engine 12 or by the rules 43 of the expert engine 12, such as preserving the life of the plant equipment, enabling maintenance and repair of the plant equipment while the plant 11 is running, etc.

In one embodiment, for example, the expert system 12 can steer the numerical solver 14 by specifying a target number of boilers, turbines, etc. to use or a range of these elements to use or to consider using in determining an optimal operating point. As another example, the expert engine 12 may specify a target auxiliary power budget or power range for the power generating equipment, (such as 5000±250 kW) to limit the solution determined by the numerical solver 14 in this manner. This targeting (steering) can be accomplished by providing these ranges as constraints 34 to be used by the numerical solver 14 during operation via the constraint block 34. In another case, the numerical solver 14 can run unconstrained in these regards but can produce a range of operational variable values that can be used in operation, and the expert engine 12 can select operating points within these ranges based on the rules 43 of the expert engine 12. For example, the numerical solver 14 could specify the optimal operating point as being in a range of values, such as specifying the use of eight plus or minus two turbine units. The expert engine 12 could then specify a more particular value to use in the operation of the plant based on the rules 43 or other information available to the expert engine 12 and/or could specify which particular turbines to use at any particular time. Of course, the interaction between the numerical solver 14 and the expert engine 12 could be implemented in both of these manners so that these units work together to determine an optimal or near optimal operating point of the plant 11 based on the objective function 46, while still satisfying the objectives trying to be implemented by the rules 43 within the expert engine 12.

In one example, the expert engine 12 could use the future forecast of load demand, environmental conditions, service conditions, etc. to choose a specific value within the range of values provided by the numerical solver 14. For example, if the expert engine 12 knows that load demand for a particular type of energy will be decreasing in the future, the expert engine 12 may select a value towards the lower end of the range specified by the numerical solver 14 On the other hand, if the expert engine 12 knows that a particular load demand be increasing, the expert engine 12 may select a value towards the higher end of the range output by the numerical solver 14.

In any event, the expert engine 12 provides the modified (if necessary) set points, and other plant variable values using the set of actions 45 to the plant controller 50 to control the plant 11 to run at the optimal operating point determined by the numerical solver 14 (and possibly modified by the expert engine 12). Of course, if desired, these actions may include outputting signals indicative of load shedding and load establishment to be performed to implement or put into effect the optimal plant operating point or operating configuration as determined by the numerical solver. Load shedding includes not only shutting down or completely removing loads from the plant, but also includes reducing one or more particular loads within the plant by reducing or lowering the operational settings of plant equipment without shutting the equipment down completely. In a similar manner, load establishment not only includes turning on equipment or reconnecting equipment within the plant, but also includes increasing the operational settings of particular plant equipment (that may already be running at some level) to thereby increase the load associated with that plant equipment. Of course, load shedding may be performed by sending signals to controllers to implement the load shedding (shutting down or reducing the operational level of plant equipment) or by operating electrical breakers or other switching equipment to remove equipment from operation in the plant. In a similar manner, load establishment may be implemented by sending signals to a controller to implement load establishment (turning on or increasing the operational level of plant equipment) or by operating breakers or other switching equipment to start up or to reconnect equipment within the plant. The signals from the expert engine that indicate the load shedding or the load establishment actions to be performed may be sent directly to the control equipment within the plant to automatically cause plant controllers or switching equipment to perform load shedding or load establishment. Alternatively, the signals from the expert engine that indicate the load shedding or load establishment to be performed may be sent to a user via, for example, a user interface, for consideration and manual implementation or to be approved by a user prior to being used to automatically perform load shedding or load establishment.

If desired, during operation, the numerical solver 14 and/or the expert engine 12 may store solutions determined for past runs of the numerical solver 14, along with the pertinent characteristics associated with or that went into forming those solutions, such as the ambient conditions, load demand, constraints, etc., in a memory. Thereafter, when solving the objective function 46 or otherwise running the numerical solver 14 to determine a new optimal operational point, the numerical solver 14 may determine one or more of the stored previous solutions which have a similar or which have the closest set of conditions, and start with that solution (e.g., first try that solution) as the potential optimal operating point of the plant for the current set of conditions, constraints, etc. This feature assists the numerical solver 14 in quickly narrowing in on an optimal solution, enabling the numerical solver 14 to operate faster because it starts iterating from a point that has been previously determined to be optimal for a similar set of conditions, constraints, load demand, etc. In particular, while the new optimal solution may not be the same as a previously stored solution due to changes in the plant equipment, differences in conditions, constraints, etc., the new solution may be relatively close to a stored solution (in a multi-dimensional space), enabling the numerical solver 14 to find the new optimal solution more quickly through the iterative method it applies in testing different plant operational points to determine an new optimal operational point.

As will be understood, any optimization performed by the numerical solver 14 will include trade-offs and will be based on the constraints and limits that reduce the possible range of solutions (i.e., operating points of the plant 11). Besides the load demands and physical limits of the hardware, these constraints include practical considerations, such as equipment not being available or equipment being set in manual mode and equipment that must be run due to other operating concerns (e.g., preventing freezing of the equipment, etc.) In the optimization design disclosed above, different approaches taken by the plant designers will also limit the possible solutions.

Of course, FIG. 1 depicts a much generalized energy management system 10 that implements a methodology that can be used in a wide variety of plants to optimize plant operation based on energy production, usage and storage costs. While the following discussion provides a couple of specific examples in which the energy management system 10 of FIG. 1 can be applied, it will be understood that the energy management system 10 of FIG. 1 can be used in a lot of other plants and in many different manners.

Figure 2:
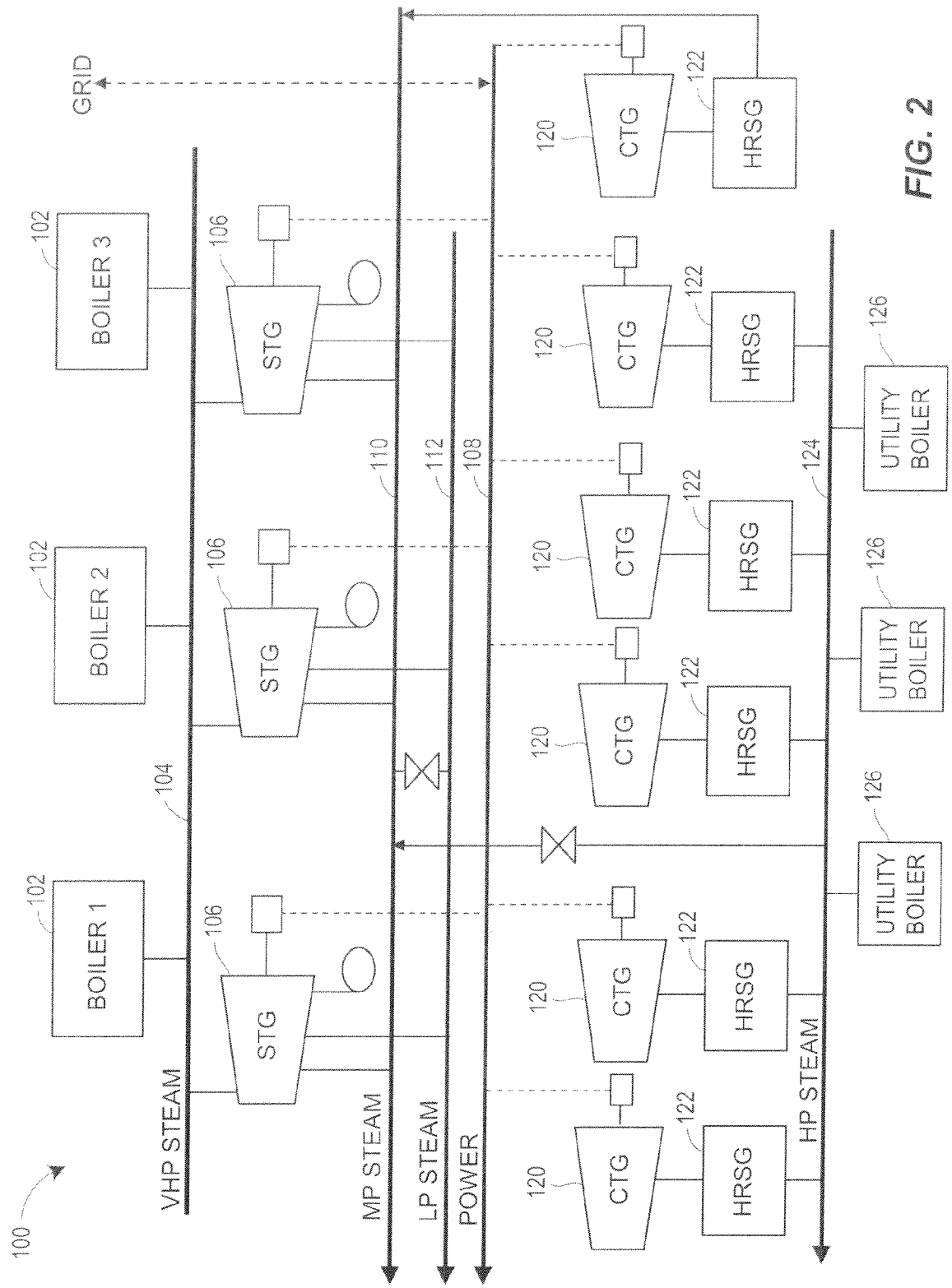
FIG. 2 illustrates a schematic and mechanical diagram of various energy components of an example industrial plant.

FIG. 2 illustrates a diagram of a steam and electrical energy production system of an example industrial plant 100 in which the energy management system 10 of FIG. 1 can be used as, for example, a load shedding and restoration system to reduce overall costs associated with energy production and use in the plant 100. As depicted in FIG. 2, the industrial plant 100 includes a set of boilers 102 which use raw materials in the form of natural gas, fuel oil, etc. to produce very high pressure (VHP) steam on in a steam line 104. Likewise, the industrial plant 100 includes a set of steam turbine generators (STGs) 106 that use the very high pressure steam on the steam line 104 to produce electrical energy, which is delivered to a power line 108. Some of the steam output from the steam turbine generators 106 is provided to a medium pressure (MP) steam line 110 and to a low pressure (LP) steam line 112, which feed or provide steam needs to other places or equipment within the industrial plant 100 (not shown).

The industrial plant 100 also includes steam generation equipment in the form of a set of combustion turbine generators (CTGs) 120 which also produce electrical energy on the power line 108. The electrical power line 108 may be connected to the public power grid and/or may provide electrical power to other energy users within the plant 100. Waste heat (in the form of combustion gases) output by the combustion turbine generators 120 is used within a set of heat recovery steam generators (HRSGs) 122 to produce high pressure (HP) steam in a steam line 124 and/or medium pressure steam on the steam line 110. Likewise, the plant 100 includes a set of utility boilers 126 that operate using, for example, fuel oil, natural gas or other raw materials, to create high pressure steam in the steam line 124. The high pressure steam in the steam line 124 may also be used in the plant 100 to operate utilities or other production equipment within the plant 100.

If desired, the steam in the steam lines 110, 112 and 124 may be used as process steam to drive other plant equipment, may be used in other processes within the industrial plant 100 or may be provided to or sold to other users outside of the industrial plant 100. In a similar manner, the electrical power line 108 can be connected to and provide electrical power to other components or equipment within the industrial plant 100, such as to pumps, lights, fans, etc. or can additionally or alternatively can be connected to the public grid so that electrical power produced within the plant 100 can be sold to third parties via the public power grid.

Thus, as will be understood, the plant 100 includes many different energy producers including the boilers 102, the steam turbine generators 106, the combustion turbine generators 120, the heat recovery steam generators 122, and the utility boilers 126. Of course, these energy producers produce energy using raw materials such as natural gas, fuel oil, etc. In some cases, an energy producer may also be an energy user as is the case, for example, with the steam turbines 106 that use steam developed by another energy producer (the boilers 102) to create electrical energy.

Of course, the operational scenarios or settings at which the plant 100 is to be run will determine the amount of energy in each of the various forms (VHP steam, HP steam, MP steam, LP steam, electricity, etc.) will be needed at any particular time in the plant 100. Moreover, there are many different methodologies or manners of running the different energy producers in the plant 100 of FIG. 2 to create a desired amount of energy in each of the required forms (electricity, steam, etc.) The loads of the plant 100 might be expressed in the terms of the required or needed power on the power line 108, low pressure steam in the line 112, medium pressure steam in the line 110, and high pressure steam on the line 124. Of course, the energy used by loads might power other plant equipment based on the demand required by that additional equipment at any particular time.

There are, of course, many different methodologies or manners to run the various different plant equipment in the plant 100 to provide or produce the required loads at any particular time, including changing the operation of the boilers 102 (by shutting one or more of the boilers 102 down, running the boilers 102 at lower outputs or capacities etc.), changing the number of steam turbine generators 106 or combustion turbine generators 120 operating at any particular time, running the utility boilers 126 or the turbines 106 and 120 at higher or lower outputs or levels, etc. Still further, some of the energy generation systems of FIG. 2 might be more efficient than others, and of course various ones of these systems use different sources of energy (e.g., natural gas, fuel oil, etc.), which might have a higher or lower cost at any particular time. Still further, it might, in some cases be less expensive to purchase electrical power form the power grid than to produce electrical energy in the plant 100. Thus, it is possible that, in the plant 100 of FIG. 2, it might be desirable to run all of the plant power systems or only a subset of these power systems at any particular time to produce energy and power in the plant 100 in the most profitable manner, taking energy costs into consideration.

Figure 3:
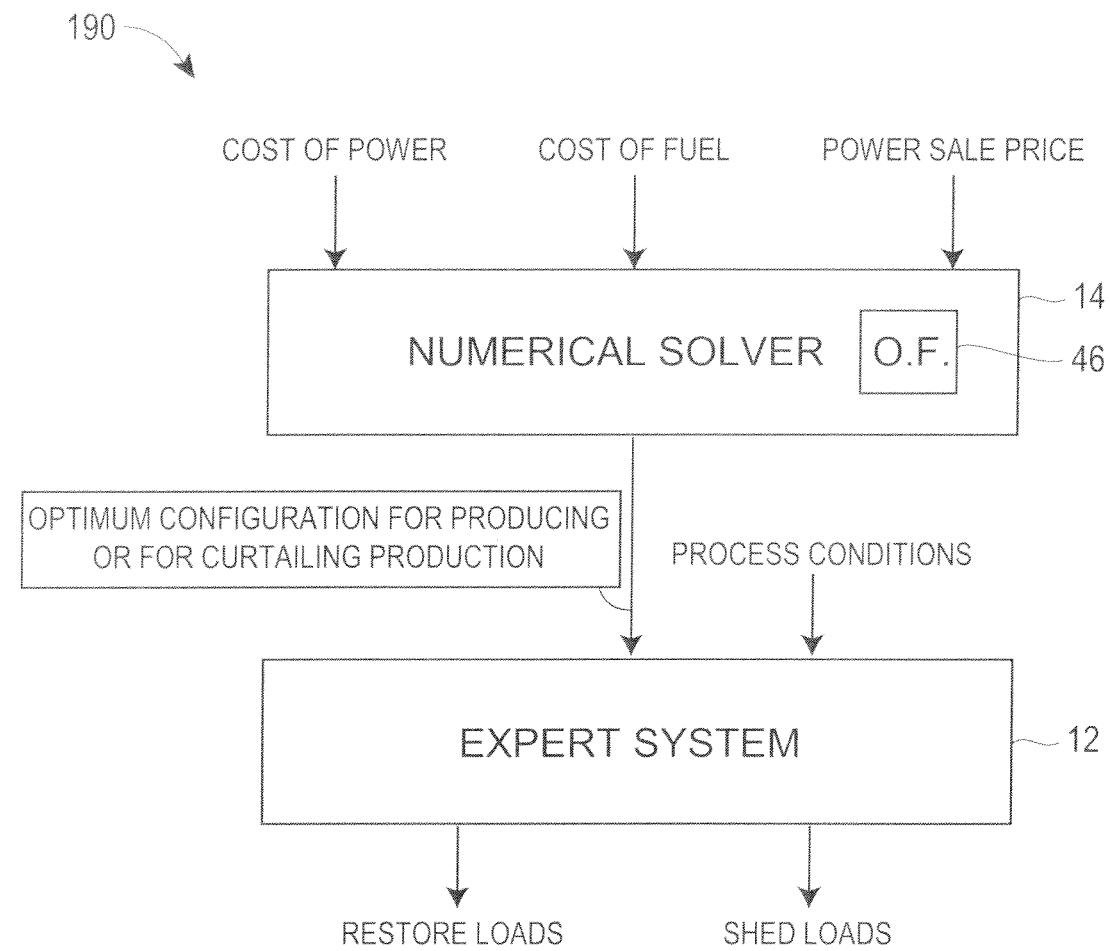
FIG. 3 is a block diagram of an energy management system of FIG. 1 as applied to the industrial plant of FIG. 2 to maximize production profits in view of energy costs.

FIG. 3 illustrates an example energy management system 190 that may be used to control the equipment within the industrial plant 100 of FIG. 2 in some optimal manner. The energy management system 190 is illustrated as a simplified form of the system 10 described in FIG. 1, it being understood that the energy management system 190 may include the various components shown in FIG. 1. Still further, it will be understood that all of the components of the energy management systems 10, 190, etc. described herein are preferably stored as computer readable instructions or programs on one or more computer readable mediums or memories and operate as described herein when executed on a computer processor. In the particular instance of FIG. 3, the energy management system 190 determines whether to shed loads or restore loads in the plant 190 by stopping and starting various pieces of the power generation equipment of FIG. 2 based on the costs of energy. Here, the energy management system 190 can determine whether to shed loads or to restore loads in the plant 100 at a particular current time based on the economics associated with the energy costs at the current time, or can determine a schedule at which to shed and restore loads over a time horizon, based on predicted energy costs associated with the running of the power generation systems in the plant 100.

More particularly, as illustrated in FIG. 3, the numerical solver 14 is coupled to the expert engine 12 and receives, as inputs, the cost of power (in various forms purchased by the plant 100), the cost of fuel (e.g., natural gas and oil) and the power sale price from the power grid. Using these factors (as well as models of the process plant equipment), the numerical solver 14 determines a plant operational scenario or plant equipment setting that minimizes or maximizes an objective function (not shown in FIG. 3). The numerical solver 14 may, for example, determine the plant operational settings (in the form of equipment to run or equipment to turn off, whether to produce and use energy, produce and sell energy, not produce energy, or some combination thereof) that minimizes the costs of energy production for a certain level of plant operation (that is, operates the various equipment of the plant at a predefined level at an optimal or reduced cost), that maximizes the profitability of the plant 100 when considering energy costs associated with the operation of the plant 100, etc. The expert engine 12 then uses the plant operational scenario developed by the numerical solver 14, as well as the process conditions that are present or that are expected at any particular time, to determine which particular set(s) of plant equipment to run or to take off line. Here, the expert engine 12 may determine which subset of equipment to remove or to place back on line based on process conditions, maintenance schedules of the plant equipment, or any other desired criteria as expressed in the rules 43 (FIG. 1) used by the expert engine 12. Moreover, the expert engine 12 may determine the order in which to shed loads or to restore loads that results in the most optimal energy usage or plant operation. The order of load shedding or load restoration can be stored as the rules 43 or can be determined using the rules 43 in various different situations. In any event, the expert engine 12 outputs load shedding signals or load restoration signals to be used to control the operation of various plant equipment, to thereby control the particular equipment within the plant 100 to implement the general operational scenario developed by the numerical solver 14. Of course, as indicated above, the outputs of the expert engine 12 may be provided to plant controllers 50 (FIG. 1) which may use these signals to implement load shedding and load restoring operations, or may be sent to a user as a recommended plant operational strategy.

In this case, the use of the numerical solver 14 as part of the energy management system 190 within an industrial plant enables decisions on when to generate power, when to buy power and when to sell power to be resolved with an objective function that yields maximum plant profit. For example, based on the market price of power at times, it may be more beneficial to curtail production at times and sell power rather than to use power to drive the process 100. In other cases, it may be more beneficial to buy power from the power grid than to create power to run the plant equipment. Of course, the particular types of considerations that the numerical solver 14 may consider or analyze in determining the optimal plant operational setting or configuration may be controlled by the expert engine 12, based on the available plant equipment, the required productivity of the plant 100, etc.

Figure 4:
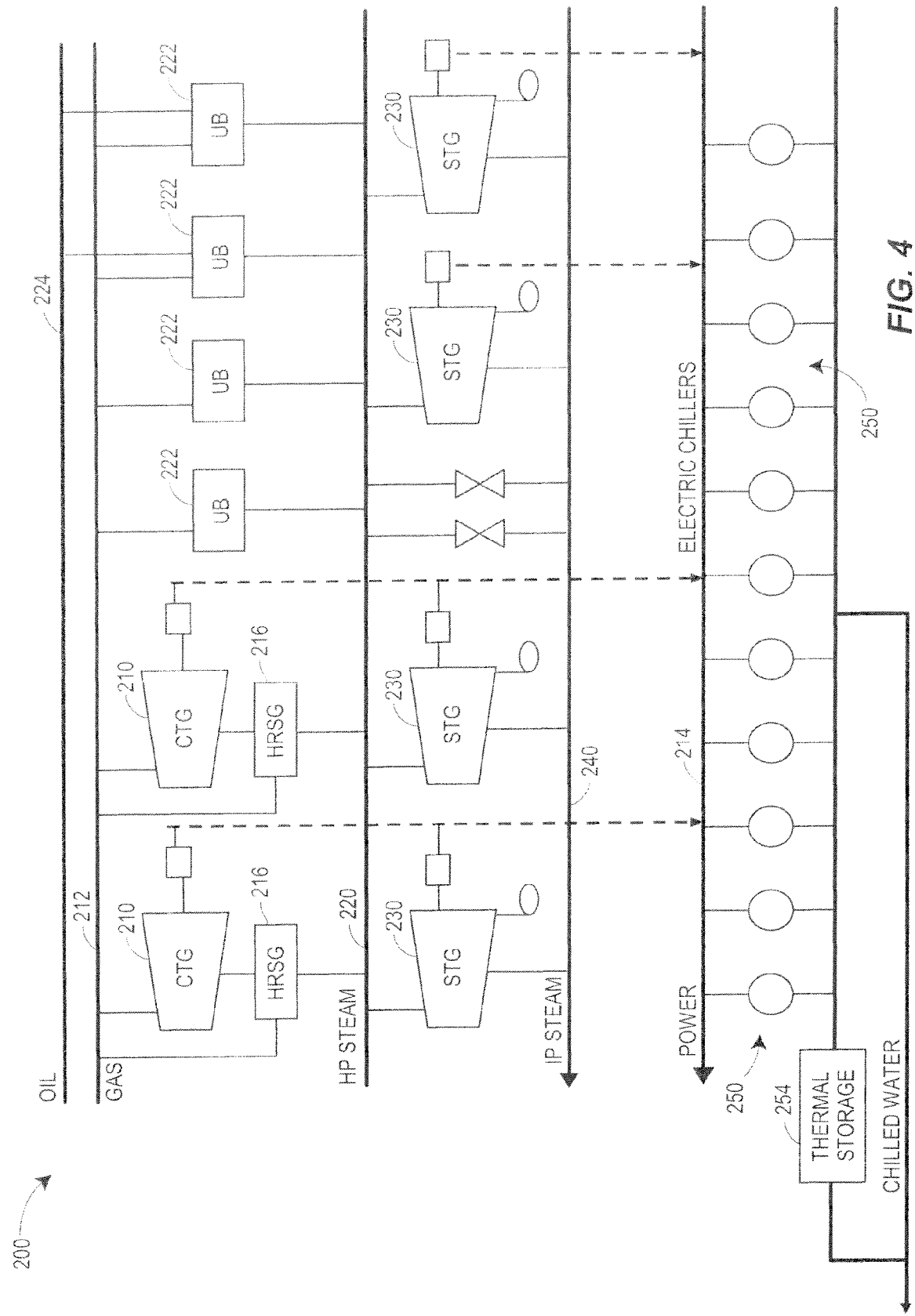
FIG. 4 illustrates a schematic and mechanical diagram of a power house associated with an example university or an industrial park campus.

As another example, FIG. 4 illustrates a plant power house 200 associated with, for example, a university or a college campus, a hotel, a condominium building or other multiple unit or multiple building power user. The power house 200 includes a set of combustion turbine generators 210 that produce electricity by burning natural gas provided via a supply line 212 and that provide the electric energy to a power line 214. Additionally, heat recovery steam generators 216 use waste heat produced by the combustion turbine generators 216, in addition to heat produced internally by burning natural gas from the line 212, to produce high pressure (HP) steam in a steam line 220. Utility boilers 222 also burn natural from the gas supply line 212 and/or fuel oil provided on a supply line 224 to produce high pressure steam in the steam line 220. The high pressure steam in the steam line 220 is then used by a series of steam turbine generators 230, which generate electrical energy and provide that energy to the power line 214. The power line 214 may be used to power electrical systems in the campus or other building setting (e.g., lights, pumps, escalators, elevators, etc.) Furthermore, an intermediate pressure (IP) steam output from the steam turbine generators 230 is provided to a steam line 240, and this steam is used, for example, to drive or power heating systems or other steam driven systems in the campus, building, etc.

Additionally, as illustrated in FIG. 4, the campus or other building includes a set of electric chillers 250, which chill water using electric power provided on the power line 214. The chilled water from the chillers 250 is provided on demand to the campus or building for cooling purposes (e.g., as a supply of a cold water, for air conditioning systems, etc.). Moreover, the chilled water from the chillers 250 may be provided to a thermal storage unit 254 which operates as a energy storage unit. At later times, the chilled water stored in the thermal storage unit 254 may be provided to the campus for air-conditioning or other uses. The chillers 250 in conjunction with the thermal storage 254 enable power to be used to produce chilled water at a time at which the natural gas, oil or electricity used to power the chillers 250 is at a lower cost, and then use the chilled water to drive air-conditioning units or other chilled water driven units at times when the electric power costs, natural gas or oil costs are higher.

Figure 5:
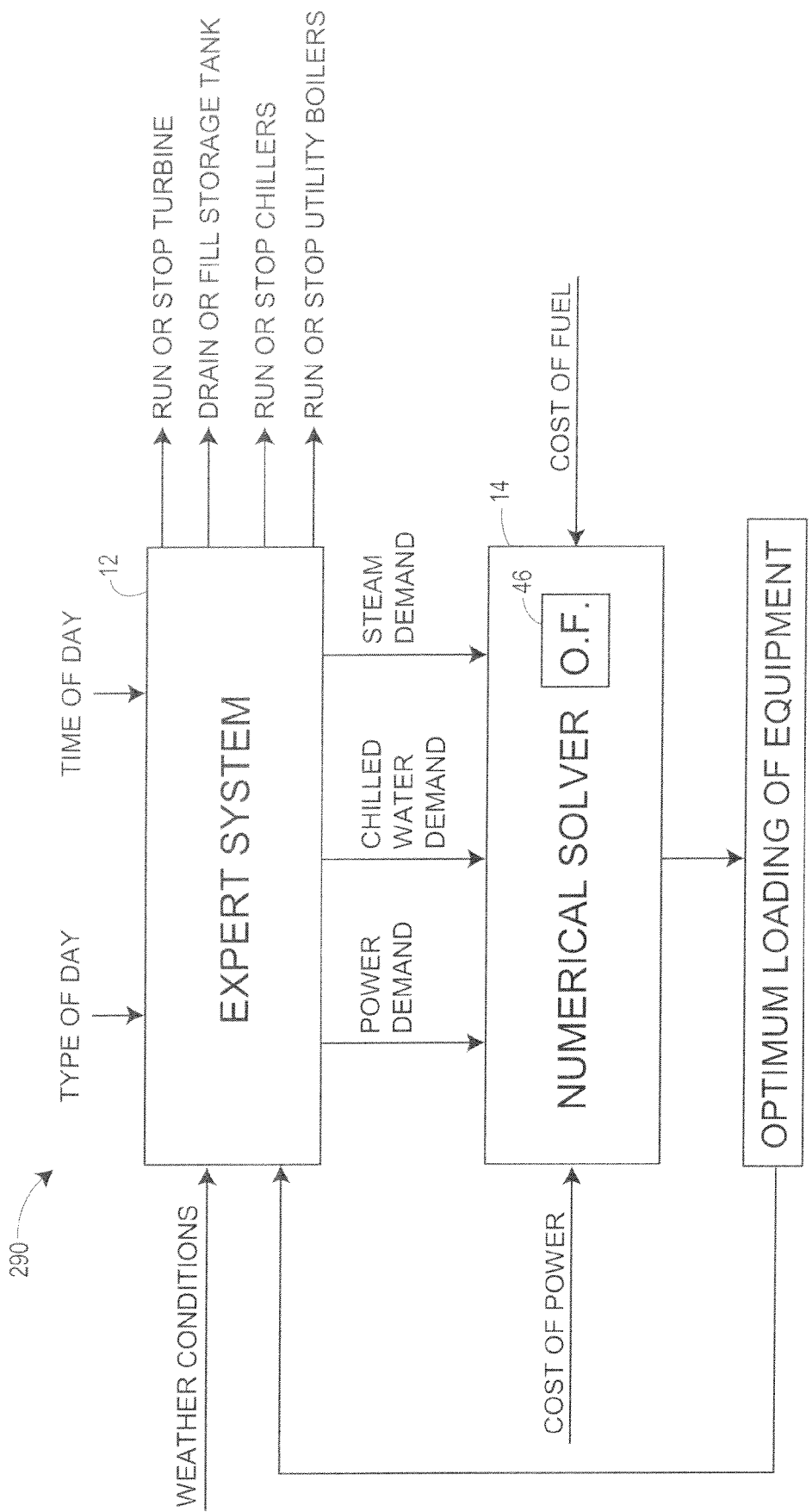
FIG. 5 is a block diagram of an energy management system of FIG. 1 as applied to the power house of FIG. 4 to determine optimum loading of equipment within the power house.

Referring now to FIG. 5, an energy management system 290, in the form of that described with respect to FIG. 1, is illustrated as including an expert engine 12 and a numerical solver 14. In this case, the energy management system 290 can be used to minimize energy costs associated with the operation of the campus or building plant 200 of FIG. 4. More particularly, the expert engine 12 may receive inputs such as the current or predicted future weather conditions, the type of day (such as whether it is a weekday or a weekend day, whether school is in session or out of session, etc.), the time of day, etc., or any other information such as a set of scheduled events to occur at the campus, building, etc. that enables the expert engine 12 to estimate the use of chilled water, steam, and other power over a particular time. The inputs to the expert engine 12 may reflect the current conditions as well as forecasted or predicted future conditions over a time horizon for which energy costs at the plant 200 will be optimized. The expert engine 12 may then develop or determine a chilled water demand, a power and steam demand, and other energy demands, that are expected to meet the needs of the campus or building during the particular time period being considered. The expert system 12 provides the chilled water demand and other energy demands to the numerical solver 14, which uses these demands, the cost of fuels (e.g., natural gas, fuel oil, electricity from the power grid, etc.) along with equipment models (not shown) to determine an optimum loading of the plant equipment form an energy cost standpoint. The numerical solver 14 may make this determination by minimizing or maximizing an objective function 46 that defines or expresses the manner of judging the optimal plant setting from an energy cost standpoint. The optimum loading may express the combination of and how many of each of the combustion and steam turbine generators 210 and 230, the utility boilers 222, the steam generators 216 and the chillers 214 to run at any particular time, or over time, to meet the required demands at the lowest energy costs. Of course, the optimal setting determined by the numerical solver 14 considers the costs of operating the various types of power generating equipment (using the models of this equipment), including the costs of the natural gas, electric power, fuel oil, etc., to obtain the desired loads in the plant 200, and may consider the option of storing chilled water for a period of time for use at a later time. In fact, in some cases, the numerical solver 14 may develop an optimal plant operational setting that operates the chillers 250 and stores chilled water for a period of time, and that then uses that stored water at a later time to satisfy load demands. In any event, the expert engine 12 receives the information indicating the optimum loading of the plant equipment and alters the operation of the chillers 250 and other power generating equipment to control the plant power generating equipment based on the optical plant operating point determined by the numerical solver 14.

In another example, the energy management system 290 could be used in an industrial site or plant that supplies hot and cold water to a city. Here forecasting software may be required within the expert system 12 to predict the hot or cold water demand based on weather forecast, season of the year, time of day and type of day such as weekend or holiday. If the expert system 12 knows that is going to be a large demand for chilled water, chillers in the plant may be turned on at the site. However, if there is not a large demand, the chilled water could be made in off peak hours and put into thermal storage and used during peak hours.

Figure 6:
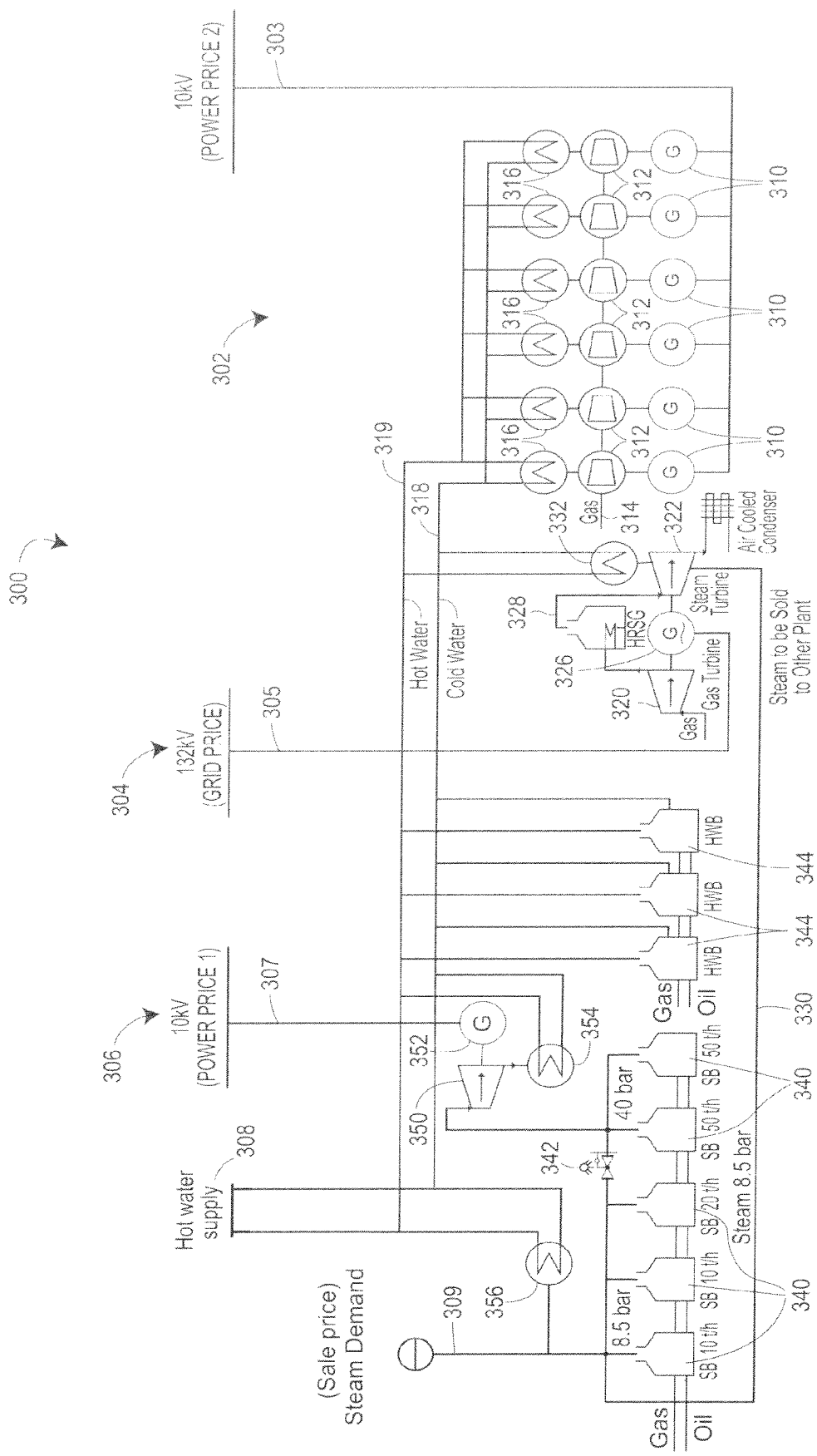
FIG. 6 illustrates a schematic and mechanical diagram of an example combined heat and power (CHP) plant.

As a still further example, FIG. 6 depicts a typical combined heating and process (CHP) multi-plant, power plant 300 in which an energy management system as described herein can be used. The plant 300 of FIG. 6 includes three separate plant areas or having different sets of power producing equipment, and these plant areas might be in three different physical locations. The plant areas include a first system 302 which produces electric power at a 10 kilovolt power supply 303 and hot water at a supply line 308, a combined cycle system 304 that produces electric power at a 132 kilovolt grid supply line 305 and hot water at the supply line 308, and a second system 306 that produces electric power at a second 10 kilovolt line 307 and that provides hot water at the supply line 308 and steam at a steam supply line 309. Thus, the CHP 300 of FIG. 6 produces energy in various forms including electric energy at the 10 kilovolt power supply 303 (which may be sold at a first price), at the 132 kilovolt power supply 305 (which may be sold to, for example, the public utility grid at a grid price) and at the 10 kilovolt power supply 307 (which may be sold at a third price). The CHP 300 of FIG. 6 also produces hot water at the hot water supply line 308, which may be sold to a town, municipality or other user, and produces steam at the steam supply line 309, which may be sold to an industrial user, a unicipality, a building or residence, etc.

As illustrated in FIG. 6, the system 302 includes six electrical generators 310 which operate by converting a motive force into electric power on the electric power line 303. Combustion engines 312 provide the motive force to the generators 310 and operate by burning natural gas (from a gas supply 314) as a fuel or combustion source. Waste heat from the combustion engines 312 is used in heat exchangers 316 to heat water in a cold water line 318, providing the heated water as hot water to a hot water line 319, which is connected to the water supply line 308.

In a similar manner, the system 304, which is illustrated as a combined cycle gas and steam turbine generator system, includes a gas turbine 320 and a steam turbine 322 which drive a generator 326 that produces 132 kilovolt electricity on the electrical power line 305. The gas turbine 320 operates by burning natural gas to drive the generator 326, and additionally produces heat which is provided to a heat exchanger in a heat recovery steam generator (HRSG) 328. The HRSG 328 produces steam which is provided to drive the steam turbine 322. Lower pressure steam output from the steam turbine 322 is provided via a line 330 to the system 306 or may be connected directly to the steam supply 309 for sale to third parties. The steam output on the line 330 may be provided to the system 306 at, for example, 8.5 bar. Additionally, heat from the steam turbine 322 is provided to a heat exchanger 332 which heats water in the cold water supply line 318, and provides hot water on the hot water line 319, which is provided to users via the hot water supply 308.

The system 306 includes a first set of boilers 340, which may be gas or oil or both gas and oil fired steam boilers. The boilers 340 may have different capacity ratings (such as 10 tons/hour, 20 tons/hour, 50 tons/hour, etc.) and may produce steam at different output pressures, such as at 8.5 bar and at 40 bar. The 8.5 bar output of the boilers 340 is connected directly to the steam supply 309. In the case of two of the boilers 340 which output steam at 40 bar, the output of the boilers may be stepped down or reduced in pressure in a pressure reducing valve or regulator 342, thereby enabling these boilers to provide steam to the steam supply 309. The system 306 also includes a set of hot water boilers 344, which may be gas fired, oil fired or both, and which operate to heat water from the cold water line 318 and provide hot water to the hot water line 319 which is then delivered to the hot water supply 308.

Still further, high pressure steam (e.g., at 40 bar) that is produced by the steam boilers 340 is provided to a steam turbine 350 which drives a generator 352 which, in turn, provides 10 kilovolt power or energy to the supply line 307. A low pressure steam output of the steam turbine 350 is used in a heat exchanger 354 to convert cold water from the line 318 into hot water which is delivered to the line 319 to be sold via the hot water supply 308. In a similar manner, ahead exchanger 356 uses steam at the 8.5 bar pressure on the line 330 to convert cold water supplied from the cold water supply line 318 into hot water which is delivered to the hot water line 319, to be sold via the hot water supply 308.

Thus, the CHP plant 300 of FIG. 6 includes various different types of power generating equipment which produce various different types of energy related outputs, including electrical power, hot watered steam. Each of these forms of energy or power may be sold at various different prices to various different users, who will have different demands at different times. Moreover, the equipment of the plant 300 uses different types of raw materials to operate, including natural gas and oil, and these raw materials may vary in price over time, or as compared to one another. All of these factors make for a very complicated analysis when determining the best manner of running the plant 300 from a profitability standpoint. In particular, in the power plant 300, it may be desirable to obtain the maximum or best usage of each of the different types of equipment based on the maximum profitability of the plant at any particular time, based on the demands (current or forecasted) for each of the different types of energy, based on the different prices at which the different forms of power or energy can be sold (currently or forecasted into the future), as well as based on the cost of the raw materials including the gas and the oil used to fire the boilers, the gas generators, the steam turbines, etc. (currently or forecasted into the future).

Figure 7:
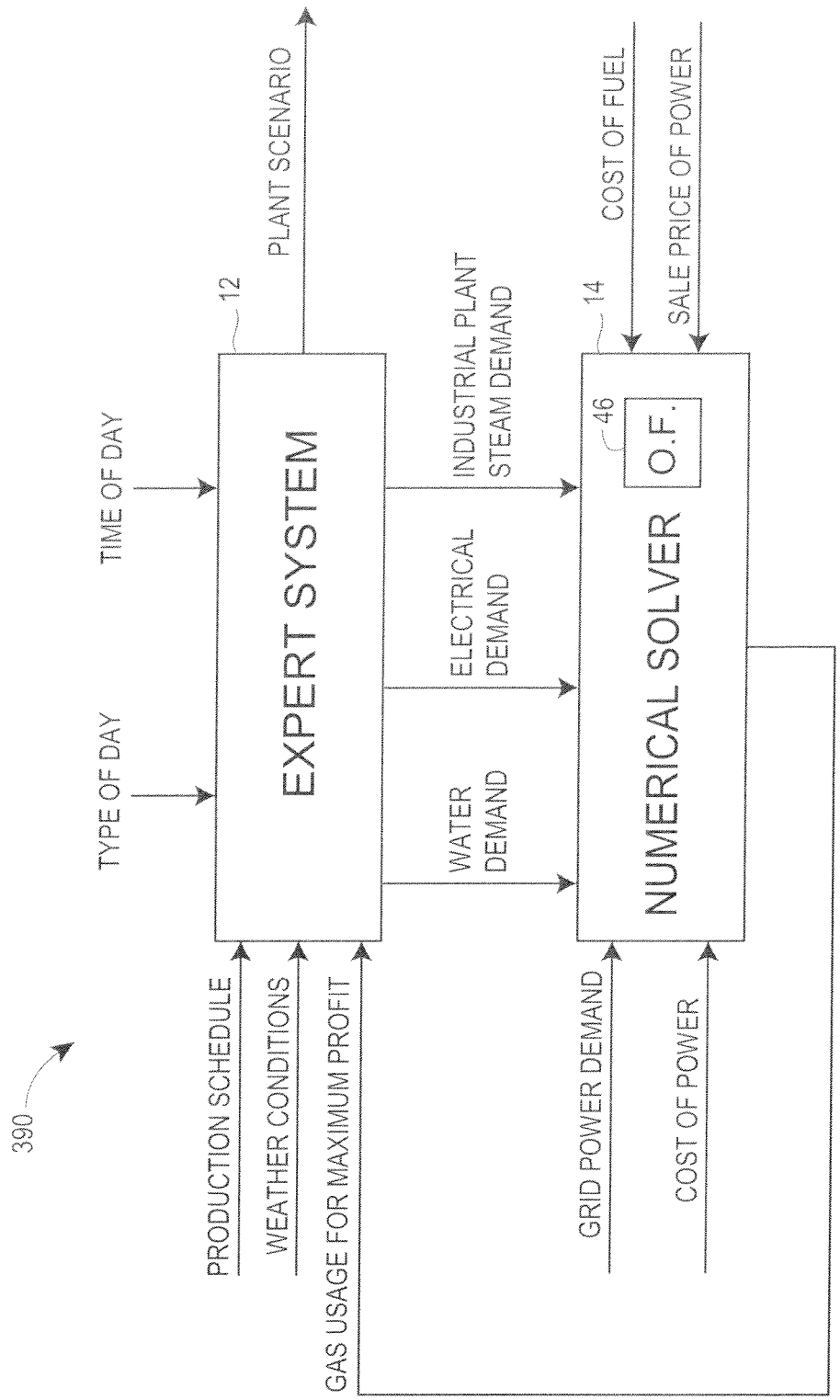
FIG. 7 is a block diagram of an energy management system of FIG. 1 as applied to the CHP plant of FIG. 6 to determine gas usage that results in maximum profit at the plant.

FIG. 7 illustrates an energy management system 390 that may be used to determine an optimal method of running the various equipment in the plant 300 at any particular time, or over a period of time, in order to, for example, obtain the highest profitability of the plant 300. The energy management system 390 is in the basic form of that described with respect to FIG. 1, and includes the expert system 12 coupled to the numerical solver 14. In this case, the expert system 12 may receive weather conditions (for various users who obtain steam, hot water, etc. from the plant 300) and production schedules associated with the users or purchasers of the various different types of energy being sold by the plant 300, including hot water, steam, electric power, etc. The expert system 12 may also determine or receive inputs as to the type of day (season, weekend or week day, holiday, etc.), the time of day, etc. The expert system 12 may then determine or estimate a current demand or a demand schedule (at the present time or over a forecasted or prediction time horizon) for each of the various different types of energy being sold by the plant 300, including a hot water demand, a steam demand, and, if desired, an electric power demand for each of the power lines 303, 305, 307. The expert system 12 provides these demands, which may be in ranges of expected demands, if desired, to the numerical solver 14. The numerical solver 14 may also receive inputs in the form of the cost of power and the sale price of power in the various forms, as well as the cost of fuel (e.g., natural gas, oil, etc.) being used within the plant 300. The numerical solver 14 then uses the objective function 46 to determine a plant operational scenario that provides the required hot water and steam demands and, if needed, the electrical power demand, that minimizes the cost of natural gas and oil used in the plant 300 or that maximizes the overall profit of the plant 300. In this case, the numerical solver 14 may consider or be able to consider providing additional power to the power grid or to one or both of the power lines 303 and 307 to increase the income of the plant 300 or, alternatively, running the plant 300 in a manner that does not provide any power to these sources if it is not economical to do so. Alternatively, as particularly illustrated in FIG. 7, the numerical solver 14 might determine the minimum gas usage plant scenario or configuration that results in the maximum profit in the CHP system 300. Of course, as illustrated in FIG. 6, the expert system 12 could receive the plant operational scenario that results in the minimum gas usage for maximum profitability of the plant 300 from the numerical solver 14 and control the plant equipment to implement this scenario. The expert system 12 could also modify or fill out the determined scenario by, for example, selecting what particular pieces of equipment to operate when the optimal scenario calls for operating only a subset of any particular type of equipment (such as less than all of the boilers 340). Alternatively, the expert system 12 could provide this scenario (as potentially modified by the expert system) 2) to a user or operator to implement.

Figure 8:
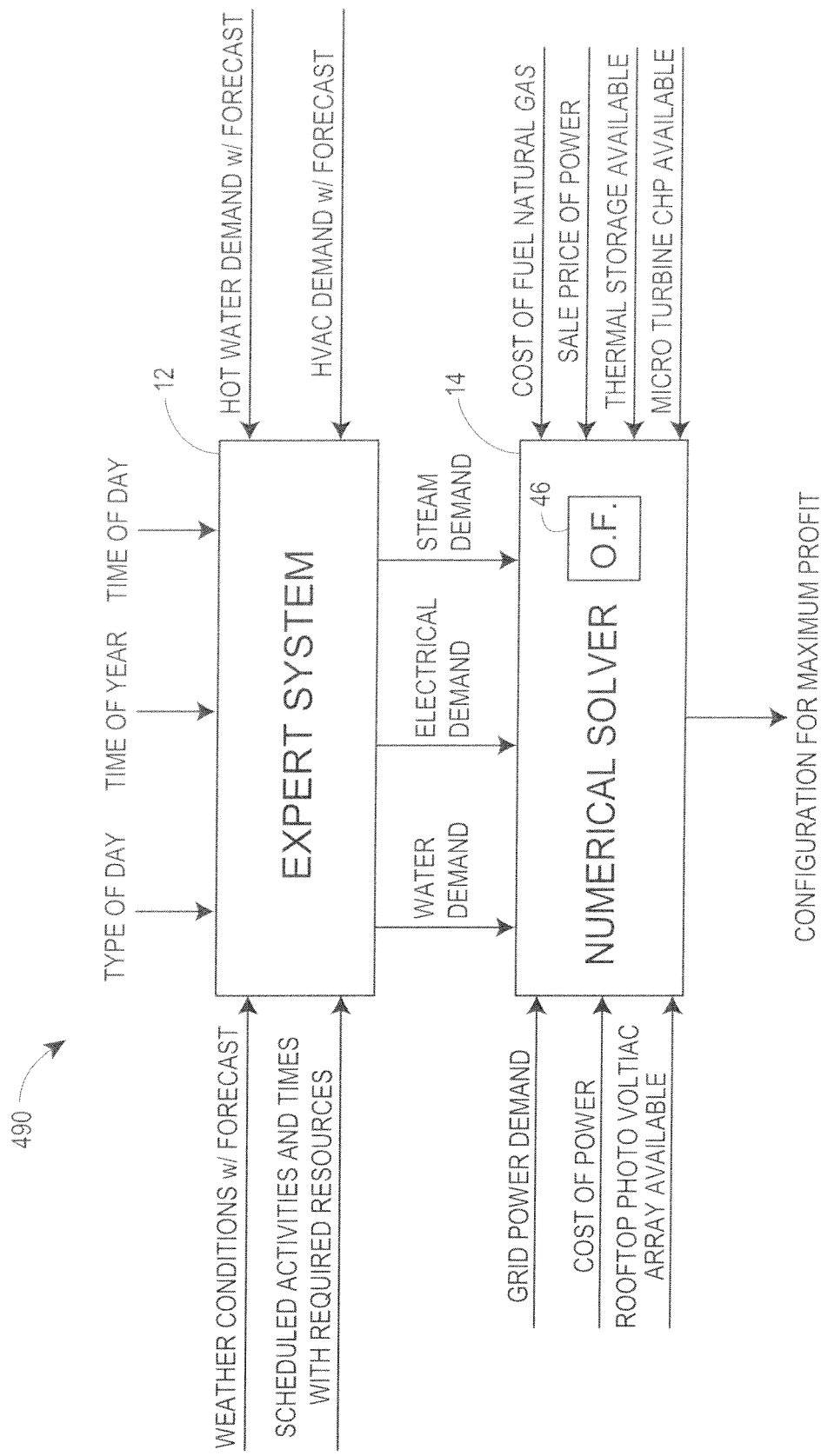
FIG. 8 is a block diagram of an energy management system of FIG. 1 as applied to an individual residence, condo or hotel to minimize energy costs.

As a still further example, FIG. 8 illustrates an energy management system 490, in the basic form of that described with respect to FIG. 1, which may be used in an individual residence, a multi-residence building, such as a condominium, a hotel, a retail mall, etc. to determine, for example, the operation of the plant that results in the minimum energy costs over a particular period of time, while still providing for acceptable operation of the various heating and cooling systems, and the other power generation, usage and storage systems that might be present in or associated with the plant. As illustrated in FIG. 8, the expert system 12 might receive, as inputs, the type of day, the time year, the time of day, etc. Additionally, the expert system 12 may receive information about current and/or forecasted weather conditions, a list of or information about scheduled activities at the plant (e.g., parties, conferences, etc.) and times and required resources for these activities. Still further, the expert system 12 may receive hot water demands and/or HVAC demands, which might be current demands or forecasted demands into the future. Using this information, the expert system 12 may determine a present or expected usage or demand for each of the energy related systems in the plant, including the electrical demand, a hot water demand, a steam demand, etc. and the expert system 12 provides these demands to the numerical solver 14. Of course, these demands may be expressed in a range of possible outputs for each of these demands to allow the numerical solver 14 some flexibility in determining a plant configuration that results in maximum profit or minimal energy usage. Of course, the expert system 12 might vary the water demands, electrical demands or steam demands provided to the numerical solver 14 over time, or may provide a forecast of demands over a prediction horizon for which the numerical solver 14 is to determine an optimal configuration.

In any event, the numerical solver 14 may also receive inputs in the form of the grid power demand, the cost of power from the grid, the cost of fuel such as natural gas used in plant equipment, and the sale price of power delivered to, for example, the power grid. The numerical solver 14 may also receive or have access to information associated with the availability of other power sources, such as roof top photo voltaic array which may provide some power based on sunlight, a microturbine CHP if that is available in the plant, power storage units such as thermal storage units, if hose are available, etc. The numerical solver 14 then uses the objective function 46 and the inputs as discussed above to determine a plant operational configuration that operates to provide the load demands that meets or falls within the demands specified by the expert system 12 and that minimizes energy costs. The numerical solver 14 may operate on information indicative of the current situation and determine an optimal plant operational point at the current time, or may operate on forecasted information over a predetermined time period to determine a set of plant operational settings over that time period that minimizes energy costs. Of course, in the later case, the numerical solver 14 may cause energy to be stored for a period of time and then used at a later time during the prediction horizon that minimizes energy costs incurred during the entire time period. While the numerical solver 14 is illustrated as providing the determined operational configuration directly to one or more controllers in the plant (hotel, condominium, apartment building, residence), etc. or providing the optimal scenario to a user to implement manually or via other non-automatic means, the numerical solver 14 could provide this determined optimal plant operational scenario to the expert system 12, which could modify this scenario in any manner described above before sending it to a controller or to a user.

Moreover, it will be understood that there are many other users of energy and sources of energy production and storage in a residential or building power supply environment that could be considered by the energy management system 490. For example, many homes or buildings include gas powered backup generators that could be controlled to produce electricity at any particular or desired time, based on the economics of doing so. Moreover, electric cars in a home can be charged when electricity costs are low and can be discharged when electricity costs are high, which may be beneficial to reduce energy costs in a home. Likewise, combined heating/cooling and power may be performed in a local ground source heat pump that may be controlled to make cold or hot water when necessary. Thermal storage devices can be filled in a home or a building during low electric energy cost cycles and can be used during high electric cost cycles. A home or building system may be controlled to make ice at night and to burn ice during hot summer days for cooling purposes. Salt baths may be used to produce heat when electric prices are high, and the salt may be melted when electricity prices are low. Additionally, local bio-digesters, hydrogen generators and organic waste gasifiers can be used to produce energy in these settings.

As will be understood, the energy management systems 10, 190, 290, 390, 490 described herein could operate in two modes of operation, including an advisory mode and a control mode and could function advantageously, in some cases, by being combined with an optimizer. The energy management systems described herein are scalable down to a single consumer of energy given the right equipment being available at the site. Moreover, the approaches described herein enable comprehensive energy management in changing economic conditions including making plant operational decisions based on or considering the cost of using power or delaying the use of power. In addition, while the energy management system 10 has been generally described herein as deciding whether to buy or sell energy in various forms (from a power supply perspective), the energy management system 10 could also operate to simply idle plant equipment for a period of time. This condition might exist when the incentives to produce power are currently not enough to start or stop equipment, but the expert system 12 detects a near term opportunity that provides a better selling opportunity or power manufacturing opportunity.

Another example of where the energy management system 10 could be used is in an aluminum manufacturing plant where the energy management system 10 may be used to determine if it is more profitable to curtail or stop production and instead sell power. In this case the numerical solver 14 could be used with a maximize profit objective and the energy management system 10 could implement both an automatic removal of electric load in the correct order and a restoration of those loads as soon as it is more profitable to start producing aluminum again. In this context, the expert system 12 would operate, using the stored rules 43, to ensure that loads are stopped and started in the proper order and to do so, the expert system 12 should store rules or procedures that define the process equipment and their interdependencies.

Of course, the very useful components of the energy management system 10 are the expert system 12, which determines the buy/sell or produce/do not produce decision based on economics, and the numerical solver 14, which analyzes process knowledge in a highly computational manner to enable the expert system 12 to make decisions. The expert system 12 also can be exploited to decide whether the time horizon for removing items from operation is warranted and the order in which equipment should be turned on and off, as the removal or restoration of loads should be performed in proper sequence and controlled by the expert system knowledge.

One advantageous method of integrating the use of both an expert engine and a numerical solver as part of an optimization system is to configure the expert engine to call the numerical solver in an iterative manner (i.e., one or more times) so as to enable the expert engine to hone in on an optimal solution by steering the numerical solver to identify an optimal solution over one or more runs of the numerical solver. In this case, the expert engine may call the numerical solver multiple times by providing the numerical solver with a first set of general constraints or equipment configuration information, by running the numerical solver to optimize the system based on those general constraints or equipment configurations, and then use the results of the numerical solver to determine anew or refined set of constraints or equipment configuration information. The expert engine may then call the numerical solver a second time providing the numerical solver with a refined set of constraints or equipment configuration parameters so as to obtain a more refined optimization based on the refined set of inputs provided to the numerical solver. The expert engine may then use the output of the numerical solver to develop a still further set of equipment constraints, etc. and call the numerical solver again. The expert engine can repeat this process for as many times as needed to develop an optimal solution for the plant. When implementing this iterative procedure, the expert engine may develop and deliver different general equipment configurations based on different configuration methodologies (i.e., those that are significantly different in their operational approach) in each of the separate calls to the numerical solver to determine which general configuration methodology may be optimal. This type of iterative call is useful when the numerical solver cannot easily, or in real time, run through all of the different possible sets of configurations of plant equipment to determine a global optimal setting. Thus, in this case, the expert system limits the scope of considerations made by the numerical solver to reduce the workload on the numerical solver. On the other hand, the expert engine may narrow down on a range (e.g., a range of equipment units to run at a given time, an equipment variable range, etc.) by supplying a general range to the numerical solver, and using the results of the numerical solver to reduce or hone in on a sub-range that results in a more optimal configuration of the plant equipment. Here, the expert engine may store enough logic or rules to be able to limit the consideration of the numerical solver in such a manner that only one call to the numerical solver is necessary. Of course, the expert engine may apply both of these procedures in different sets of calls to the numerical solver.

Figure 9:
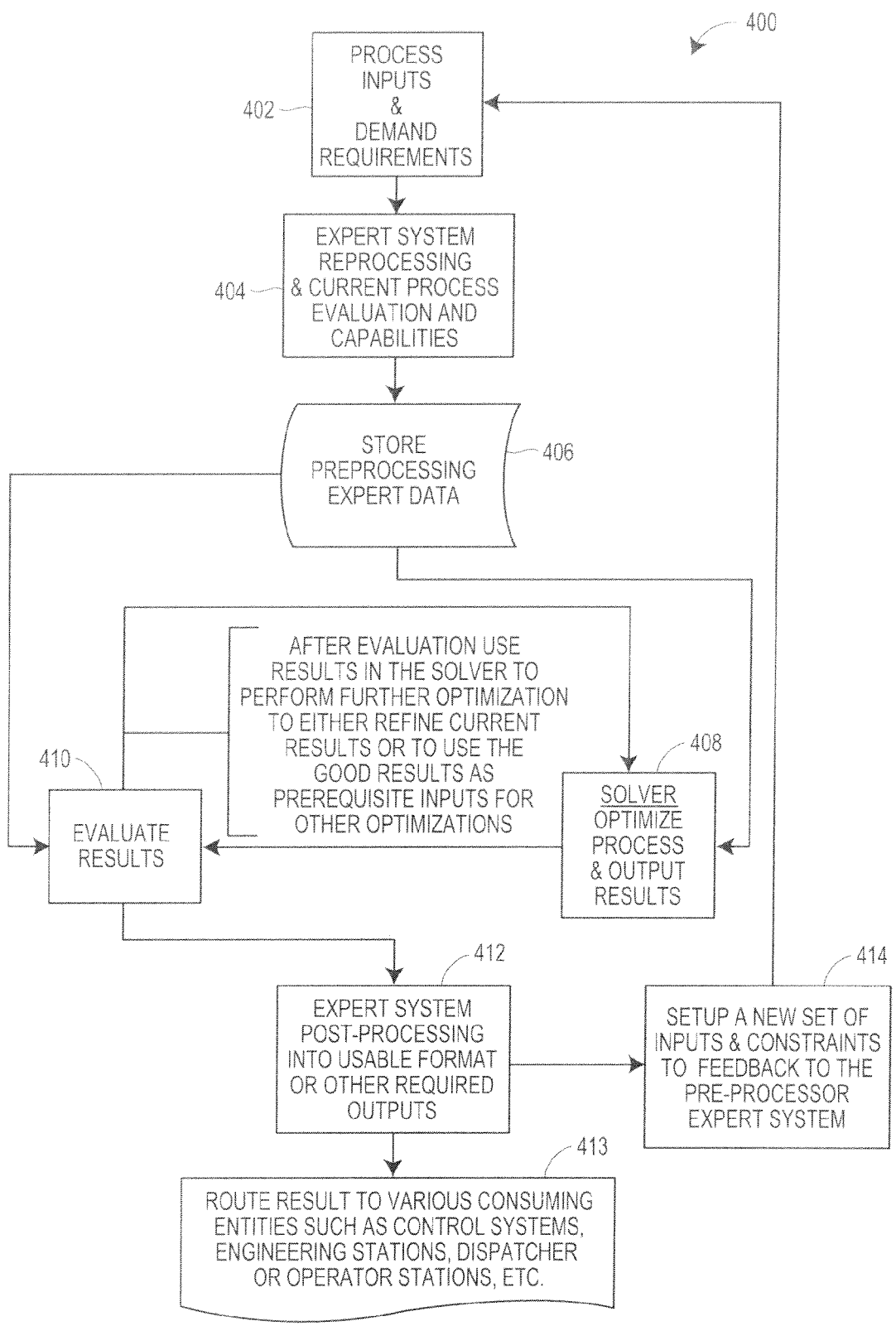
FIG. 9 is a flow chart illustrating an example method implemented by an optimizer having an expert engine that iteratively calls a numerical solver to determine an optimal plant/community configuration.

FIG. 9 illustrates a general flow diagram 400 illustrating one method of implementing iterative interactions between an expert engine and a numerical solver that can be used to develop an optical plant solution, with the optimality of the particular plant solution being defined by an objective function used in the numerical solver. While the objective function described in the examples above determines a lowest or optimal energy usage configuration, other objective functions can be used as well or instead, including those which determine an optimal solution that optimizes the quality of a product, the amount of an end product produced from a particular set of raw materials, the cost of raw materials used, the energy used in processing activities, etc., or a combination of two or more of these or other objectives.

In any event, a block 402 within the flow diagram 400 collects, accepts or determines a set of process inputs and demand requirements for which optimization of the plant will be determined. The process inputs may be, for example, the amounts of and properties of the raw materials provided to the plant, the ambient conditions (e.g., temperature, pressure, humidity, etc.) to which the equipment in the plant is subject or other current conditions within the plant such as the status of various plant equipment, and any other inputs or data about the plant relevant to plant optimization. The plant demand may be a demand for an amount of plant output (e.g., power in various forms such as electrical power, steam power, etc., an amount of produced material, such as a physical product or a processed product, such as distillate water in a desalination plant, etc.). Additionally or alternatively, the demand may be in the form of a quality of an output of the plant (e.g., a quality of material or power produced by the plant as defined by measurable characteristics of the material or power), or any combination of quantity and quality.

The process inputs and demands, which may be developed in or associated with for example, a control system, a user interface system, etc., are provided to a block 404 which preprocesses these inputs to perform current process evaluation and to determine process capabilities based on rules or any other knowledge database stored in the expert engine. Generally speaking, the block 404 may be performed by an expert engine such as any of those described herein. A block 406 may then store the preprocessed data and provides this data to a numerical solver for processing, such as any of the numerical solvers described above, to determine an optimal plant configuration based on the stored data and the objective function being used by the numerical solver. The analysis performed by the numerical solver may be performed using any set of process models stored for the plant or other grouping of equipment, and using the constraints and other preprocessed information from the expert engine, which directs the analysis performed by the numerical solver. Of course, the numerical solver also uses an objective function (which may be any mathematical relationship that defines or identifies the relative optimality of different outcomes as compared to one another). The processing performed by the numerical solver is illustrated at a block 408, which provides its results (i.e., an optimal result as determined by the numerical solver based on the inputs and constraints provided thereto and the objective function stored therein) to a block 410 which may performed by the expert engine.

At the block 410, the expert engine evaluates the results of the numerical solver developed based on the stored preprocessed data (delivered from the block 406) using a set of rules stored in the expert engine. The expert engine may then change or refine the inputs or data provided to the numerical solver (i.e., at the block 408) if necessary to obtain a different or more refined optimization. In this case, using the rules in the expert engine, the expert system may evaluate the results of the numerical solver (in terms of an optimal plant configuration based on the previous sets of inputs provided to the numerical solver) and may modify the inputs to the numerical solver (in manners defined by or allowed by the actions stored within the expert engine) to provide anew set of inputs and parameters to the numerical solver. The numerical solver then runs or operates on this new or refined set of inputs to determine a new or different optimal plant configuration or plant operating solution, which is then provided back to the block 410 for evaluation by the expert engine. As will be understood, in some cases, the expert engine may change the inputs to the numerical solver by refining certain inputs (such as ranges, numbers or variable values used in the numerical solver) or by allowing or enabling new inputs or decisions to be used in the numerical solver. The expert engine may refine or change these inputs based on the results of the previous evaluation(s) of the numerical solver to determine or select a value or range used in the next set of inputs to the numerical solver. Here, the expert engine evaluates and uses the results of a previous run of the numerical solver to determine the inputs to be used in the next run of the numerical solver so as to refine or hone in on an optimal plant solution. In other cases, the expert engine may provide vastly or significantly different plant configurations, constraints or operational directions to the numerical solver and may compare the outputs of the numerical solver for each of these different scenarios to determine which scenario is more optimal. For example, in this case, the expert engine may configure the plant equipment to run differently (such as causing a burner to burn gas instead of oil, running a power unit in a combined cycle mode instead of a single cycle mode, etc.) so as to test different possible (and inconsistent) manners of configuring the plant, and may then compare the results of the different runs to determine which plant configuration methodology is better or provides more optimal results. Of course, the expert system may determined which of the possible general equipment configurations or settings are best in initial runs of the numerical solver and may then hone in on or determine particular variable values or ranges to use in the determined plant configuration methodology in later runs of the numerical solver. The expert system (implementing the block 410), may call the numerical solver (implementing the block 408) any number of times, as needed, to determine an optimal plant operating configuration. In some cases, the expert system may have enough logic stored therein to be able to effectively limit the mathematical considerations (i.e., to limit the scope of the optimization problem being considered by the numerical solver) based on this logic so that the numerical solver only needs to be called once.

At some point, the output of the block 410 is provided to a block 412 (also typically implemented by the expert engine) at which the expert engine performs post processing of the optimal result determined by the numerical solver. This post processing may be in the form of, for example, selecting particular equipment or settings of particular equipment within the plant (again based on the rules and actions stored in the expert engine) and these settings may be provided to a control system or to a user for use in implementing the optimal plant configuration determined by the iteratively connected expert engine and numerical solver. As illustrated by a block 413, the results of the post processing can be routed for consumption to various entities including, for example, to control systems for taking control system actions to implement the determined results or configurations, to engineering stations for engineering evaluation, to dispatcher or operator stations for suggesting advisory actions to be taken, or to any other system that may use, display or act on these results.

Moreover, while the post processing may be performed to actually implement the optimal plant configuration determined by the iteratively connected expert engine and numerical solver to, for example, implement other goals or constraints of the system (e.g., such as running different plant equipment equally, running the equipment in a safe manner, allowing for the shutdown of equipment under repair, etc.), the results of the post processing could also be used to redefine the constraints, demands or other plant input conditions to be used by the optimizer in the first place. This action is illustrated by the block 414, which may determine that the load demands are not capable of being practically implemented or obtained at the current plant conditions, and which may determine or suggest new load demands that are more practical. The block 414 may also, for example, suggest changes to plant inputs or ambient conditions in the plant to obtain better results. In any event, in this case, the block 414 may provide the new plant load conditions and/or plant inputs to the optimizer to be used in a further run of the optimizer so as to develop abetter or more optimal solution for the plant based on new load demands or plant input conditions.

The combination of an expert system and a callable numerical solver enables the solving of very complicated optimization problems in which many decisions need to be made, in near real time. Generally speaking, neither an expert system nor a traditional optimizer (numerical solver) by itself is not robust enough to meet the demands of this complex challenge. More particularly, the complex optimization problem exists because models are developed to reflect the operation and interactions of a system, such as a plant/community. However, depending on the complexity of system demands, some subset of equipment must generally remain running or must be set to be running. To allow for this need, the plant model usually contains integer variables such as binary variables that can have value of 0 or 1, indicating if a piece of equipment should be on or off In this case, there is generally an equation (an equipment model) for any equipment that might be run (to produce product or to satisfy load demands). There is also a model defining the equipment consumption or operation during use in production. In some cases these relationships may be linear or non-linear.

However, when a numerical solver is presented with an optimization problem that contains non-linear equations, then a non-linear algorithm must be used to solve the set of simultaneous equations. When this optimization problem also contains binary or integer variables, it becomes more complex. For example if a problem has 10 binary variables, in order for the solver to know it has the "global optimum solution," the solver needs to solve $2^{10}$ combinations of problems, and then choose the best solution. This set of calculations cannot be solved in real-time, especially when the underlying model equations or equipment relationships are non-linear in nature.

Moreover, while the solver will, if given enough processing time, return a good mathematical answer, this answer may not be acceptable in a real life application. As an example, the numerical solver may be given a set of steam and power demands and may find a solution where boiler numbers 3 and 5 of a plant should be turned on. Thereafter, the power or steam demand may vary by a very small amount, and in response to this change in demand, the solver may determine that it is best to turn boiler number 3 off and to turn boiler number 4 on. Even if this action implements a plant configuration that results in an "optimal" energy cost solution, in real life, a plant operator would never turn one boiler off and turn another boiler on for a small change in process demand due to the time, effort, cost and wear and tear on equipment associated with the actions of turning boilers on and off in rapid succession. Thus, this solution is not practical in real life applications.

However, an iteratively connected expert system and numerical solver as described herein can operate to overcome both of these problems. In fact, when using the iteratively connected expert engine and numerical solver, as described above, the expert engine operates to pre-process the plant data and then calls the numerical solver one or more times, each time causing the numerical solver to consider a limited or subset of the overall global optimization problem. This pre-processing can be performed in a manner that significantly reduces the computational load on the numerical solver by limiting the optimization problem being determined or considered at any particular time by the numerical solver. Moreover, the expert system evaluates the results of the numerical solver and may then change the plant data input into the numerical solver so as to find a solution that is practical in real-life situations. Thus, the iteratively connected expert system and numerical solver operates to reduce or eliminate the real life problems associated with finding an optimal solution present in prior art optimizers. More particularly, the expert system described herein is utilized to run a constrained optimizer (numerical solver) and then evaluates the results of the optimization to consider what needs to be done next. In many cases, the next step is to refine or change the inputs of the numerical solver based on the previous runs of the numerical solver to obtain a more refined or a different solution that is more workable in real life and is thus more optimal from a practical standpoint. For example, the expert system may perform in another, more refined optimization, with new or additional constraints or operational settings, so that the expert system, in its iterative calling of the numerical solver, assists in the steering of inputs into the numerical solver, so as to develop a final solution in an iterative manner. The system described herein embeds the ability of a numerical solver into an expert systems (in which the numerical solver can be invoked from the expert system as needed or in an iterative manner), while allowing pre-processing and post-processing expert logic to be applied to the problem being considered by the numerical solver and to the results returned from the numerical solver to thereby determine an optimum solution that is valid for practical applications.

Figure 10:
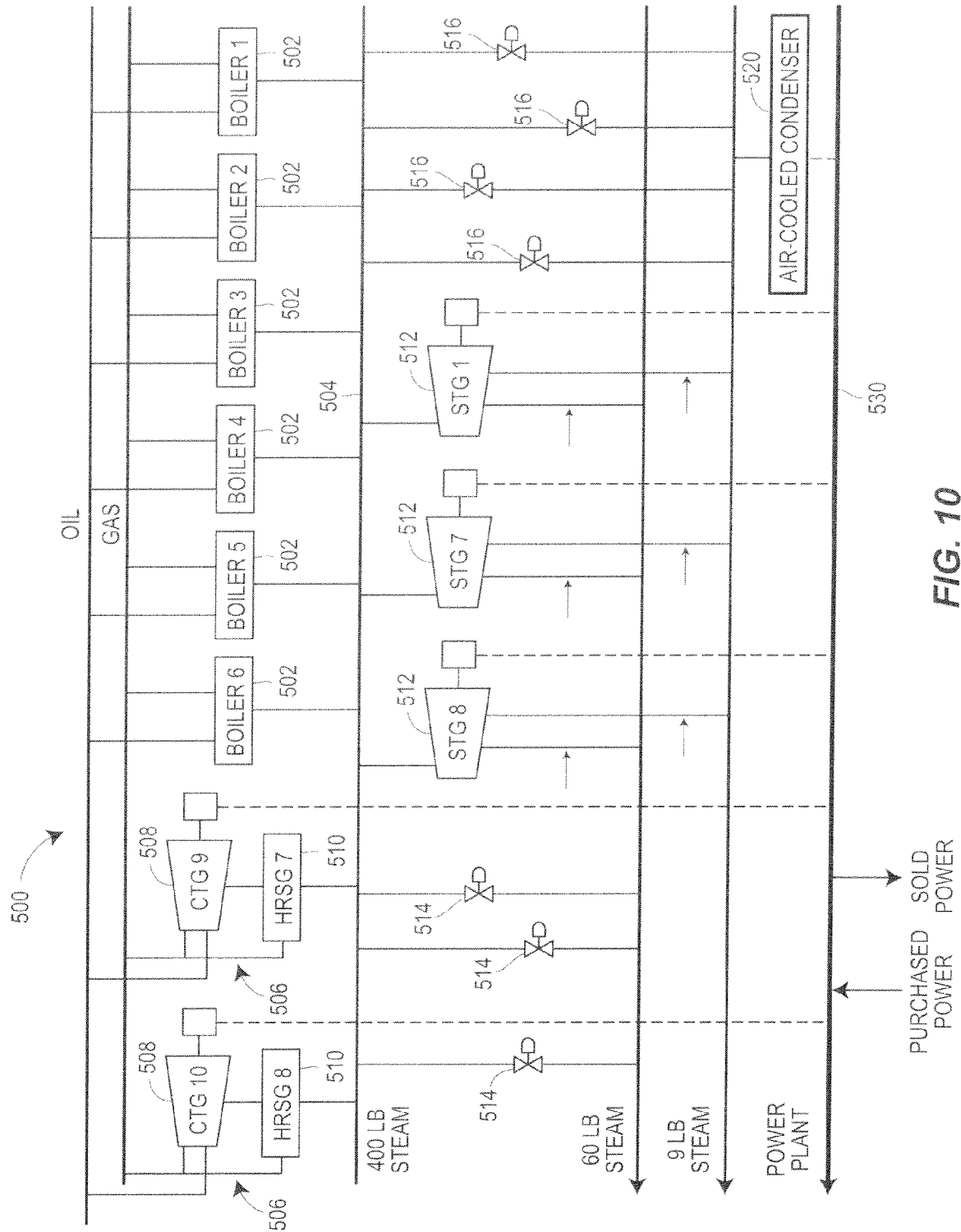
FIG. 10 is a block diagram of a university power and steam generation plant in which an optimizer having an iteratively coupled expert engine and numerical solver can be used to minimize energy costs.

One example plant in which an optimizer having an iteratively connected expert system and numerical solver can be advantageously used is illustrated in FIG. 10, which illustrates a one-line diagram of a steam and power plant 500 of a university. The purpose of the plant 500 is to supply steam and power to the various areas of the university campus and an associated hospital. Moreover, the purpose of the optimization system is to determine the optimal operating mode(s) for all of the steam and power producing equipment so that the process steam and power demands of the university and hospital are satisfied at least cost.

In particular, the plant 500 of FIG. 10 includes six boilers 502 that can burn either gas or oil (but not both simultaneously). The boilers 502 make steam that feed a 400 PSIG header 504. In addition to the six boilers 502, the plant 500 includes two heat recovery steam generators (HRSG) units 506. Each HRSG unit 506 has a combustion turbo-generator (CTG) 508 that burns either gas or oil and that supplies exhaust heat to an HRSG 510. The HRSGs 510 have auxiliary fuel firing, but only gas can be used for this fuel. The HRSGs 510 also feed the 400 PS(G steam header 504 (in addition to the six boilers 502). The design steam temperature in the header 504 is 750 Deg F. However, the actual steam temperature and pressure of the steam produced by the boilers 502 and the HRSGs 510 are not designed values. The values shown in Table 1 below provide an example average temperature and pressure determined from plant data.

TABLE 1

| BOILER | TEMPERATURE | PRESSURE |
|---|---|---|
| 1 | 718.9 | 403.08 |
| 2 | 722.43 | 403.19 |
| 3 | 710.79 | 392.1 |
| 4 | 715.0 | 406.3 |
| 5 | 629.26 | 396.5 |
| 6 | 751.96 | 402.98 |
| HRSG 7 | 705.8 | 414.4 |
| HRSG 8 | 721.09 | 404.47 |

The 400 PSIG steam at the header 504 is used to feed three steam turbo-generators (STG) 512. Each of the STGs 512 has a 60 LB high-pressure extraction and a 9 LB low pressure extraction. If an STG 512 is running, there must be some 9 LB exhaust steam, but the 60 LB extraction flow can be zero. The STGs 512 are back-pressure turbines, and a desuperheater is connected to each turbine extraction port. In addition to the STG extraction ports, three pressure reducing valves (PRVs) 514 operate to reduce the 400 LB steam to 60 LB steam, and four PRVs 516 operate to reduce 400 LB steam to 9 LB steam. A desuperheater is associated with each of the PRV extractions as well. In addition, an air-cooled condenser 520 exists for the 9 PSIG turbine exhaust steam. A valve (not shown) must be opened to allow steam into the condenser 520, and this steam does not automatically flow into the condenser if the pressure becomes high on the 9 LB header. The condenser 520 can be used to obtain additional internal power. However, some of that power gets consumed by the condenser fans. As will be understood from the diagram of FIG. 10, the CTGs 508 and the STGs 512 produce electrical power provide to a power line 530.

The primary goal of the powerhouse 500 is to satisfy the steam demand of the university and hospital, and the electrical power that is produced in this system is really a by-product of the steam production. The amount of electrical power produced as a result of the production of steam is generally insufficient to meet the entire campus power demand. However, remaining power needed by the university is purchased from the local utility. Of course, the price of power purchased from the local utility varies with time of day, and it is possible to sell power back to the grid in some instances.

As will be understood, a model of the plant 500 that reflects the operation and interactions of the steam and power producers can be developed and provided to a numerical solver. Depending on the steam and power demands, some subset of equipment must be running. Therefore, the plant model will contain binary variables that can have values of 0 or 1, indicating if a piece of equipment should be on or off. In addition, the various steam and power producing units must be modeled. For example, there needs to be an equipment model (e.g. an equation) for a gas turbines 508 that produces power as a function of heat and fuel. A model must also exist for the boilers 502 that models steam flow as a function of fuel heat. In some cases these relationships may be linear or non-linear. Likewise, the interactions of 400 PSIG steam, the 60 PSIG steam and the 9 PSIG steam, via the PRVs 514 and 516 must be modeled, based on whether the PRVs are open or closed. Likewise, models exist for the air cooled condenser 520 as well.

Importantly, when the numerical solver is presented with an optimization problem that contains non-linear equations, then a non-linear algorithm must be used to solve the set of simultaneous equations. When this problem also contains binary or integer variables (as will be the case for the various settings of the power producing units and valves in the plant 500), the optimization problem becomes more complex. For example, if the problem has 10 binary variables, then the solver must solve $2^{10}$ combinations of problems or models to determine a "global optimum solution." These calculations cannot be solved in real-time. Moreover, even if the solver returns a good answer from a mathematically optimal standpoint, this answer may not be practical in a real life application, and thus may not be acceptable. For example, the solver may be given a set of steam and powers demands and find a solution where boiler numbers 3 and 5 should be on. Thereafter, when the power or steam demand varies by a very small amount, the solver may say to turn boiler number 3 off and to turn boiler number 4 on. Even if the final solution cost is good in real life, the plant operator would never turn one boiler off and turn another boiler on for a small change in process demand.

However, when this same optimization problem is addressed by the iteratively connected expert engine and numerical solver, as described above, the expert system may be able to enable the numerical solver to operate with all linear equations with integer variables or to operate in a manner that does not need to consider all of the plant equipment configuration possibilities from an optimization standpoint, which eliminates the non-consistency of equipment selection. More particularly, the expert system may preprocess the plant data and demands to reduce the possible plant configurations and variables to be considered during optimization within the numerical solver, or may provide inputs to the numerical solver in a manner that enables the solver to operate using more simple models (e.g., linear equations with no binary settings), or to operate in a manner in which the numerical solver does not need to find a global optimal solution. Instead, the expert engine can define various different plant configurations that are local in nature (i.e., in which some of the plant equipment is off or on or otherwise configured in a manner does not include the full possible range of operation of this equipment), and the expert system can iteratively provide all or a subset of these configurations to the solver to determine an optimal solution for each of these local configurations. The expert engine can then compare the results of the numerical solver as determined for each of these local plant configurations to hone in on a plant configurations that is optimal in some manner. The rules within the expert engine can be established to enable the expert system to modify the local plant configurations, or select to skip analyzing certain local plant configurations, based on the outputs of the numerical solver for other local configurations. For example, if the expert engine determines from several runs of the numerical solver, that the addition of particular plant equipment of a certain type is merely increasing the overall operations cost, the expert system may skip analyzing further local configurations that have more of that equipment being operational. In this manner, the expert engine can steer the numerical solver into analyzing and finding optimal solutions for local configurations that prevent the numerical solver from having to implement mathematically complex models, that prevent the numerical solver from having to analyze a large number of plant configurations when developing an optimal configuration, from analyzing plant configurations or scenarios that are not practical to implement in any event based the current physical or operational settings of the plant or based on other equipment characteristics that must be considered when implementing an operational solution, etc. Of course, in some cases, the expert system may have sufficient rules to enable the expert engine to limit the scope of plant configurations considered by the numerical solver so that the numerical solver only needs to be called once.

Likewise, if the integer variables can be eliminated from the non-linear problem then an optimization solution is also valid. By using an expert system to preprocess data and then calling the numerical solver to operate on the preprocessed data, and evaluating the results using further expert engine rules, the problems of prior art optimizers can be reduced or eliminated. Thus, the iteratively connected expert system and numerical solver described above enables an optimizer to embed the ability of a numerical solver in an expert system that can invoke that numerical solver as needed, and that performs preprocessing and post-processing logic which is applied to the results returned from the numerical solver to determine an optimum solution that is valid for practical applications.

Figure 11:
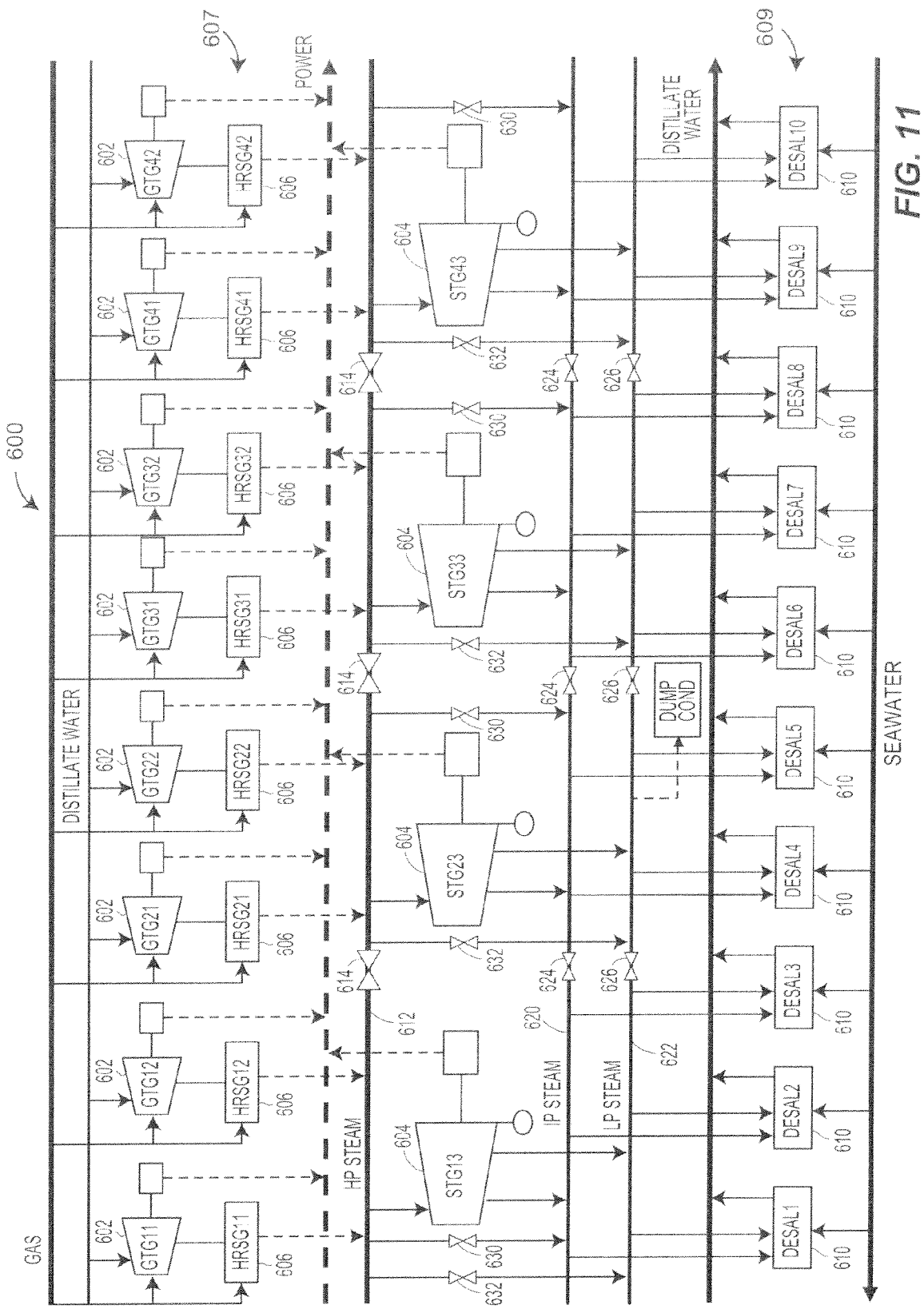
FIG. 11 is a block diagram of a desalination plant in which an optimizer having an iteratively coupled expert engine and numerical solver can be used to minimize operational costs while producing a particular megawatt (MW) demand and distillate water demand.

As another example, embedding a numerical solver in the expert system can be useful in performing optimization in a desalination plant 600 as shown in FIG. 11. The purpose of the optimization to be performed in the plant 600 is to determine the optimal megawatt (MW) assignments for a set of gas turbine generators (GTGs) 602 and a set of steam turbine generators (STGs) 604 as well as the optimal duct burner fuel assignments a set of heat recovery steam generators (HRSGs) 606 so that the net power and water demands of the plant are satisfied at the least cost. This optimization requires the determination of which set(s) of equipment to turn on and off at any particular time given the load demand and ambient conditions, as well as the costs of raw materials such as natural gas and ammonia.

As will be understood from FIG. 11, the desalination plant 600 can be thought of as containing a power plant 607 having four power blocks driving a desalinization plant 609 having ten desalination units 610, wherein each power block includes two GTGs 602, two HRSGs 606 and a single STG 604. Each GTG 602 has an inlet air evaporator that can be used to cool the compressor inlet air temperature, which increases the power (MW) capacity of the GTG 602. The hot exhaust of each GTG 602 feeds an associated HRSG 606 and each HRSG 606 has supplemental fuel firing so that extra fuel gas can be burned to increase the amount of steam produced by the HRSG 606. The HRSGs 606 of the four power blocks feed a common high pressure steam header 612. The design conditions of this steam header 612 may be 101 bara and 566 Degree Celsius. As will be seen, there are three isolation valves 614 disposed in series in the header 612 to enable the header 612 to be divided into four separate sub-units.

Additionally, as illustrated in FIG. 11, the STGs 604 are each connected to one of the sub-sections of the HP steam header 612 and provide steam to an intermediate pressure (IP) steam header 620 and to a low pressure (LP) steam header 622. Similar to the HP steam header 612, the IP steam header 620 and the LP steam header 622 can be divided into up to four separate sub-sections by the use of three isolation valves 624 and three isolation valves 626 disposed in series in the headers 620 and 622, respectively. Additionally, a set of pressure reducing valves (PRVs) 630 includes a PRV 630 disposed between each of the HP header 612 sub-sections and the IP header 620 subsections, while a set of PRVs 632 includes a PRV 632 disposed between each of the sub-sections of the HP header 612 and the LP header 622. As will be understood, the isolation valves 614, 624 and 626 and the PRVs 630 and 632 enable the plant 600 to be divided into up to four power blocks powering the desalination units 610 of the desalinization plant 609. For example, the control system is designed so that each of the HRSGs 606 will supply steam to the STG 604 in its respective power block. In particular, the steam required for the STG13 throttle must be supplied by HRSG11 or HRSG12 in FIG. 11 when the isolation valves 614 are closed. If HRSG11 and HRSG12 are out of service, then STG13 cannot run (again assuming that the valves 614 are closed). Moreover, the IP and LP extractions on the STGs 604 and the pressure reducing stations in the power blocks feed the Ip and LP steam headers so that each of the four power blocks includes one subsection of each of the HP header 612, the IP header 620 and the LP header 622. The desalination units 610 consume IP and LP steam from the headers 620 and 622. Common operation may be that power blocks 1 and 3 normally supply steam to three desalination units 610 each, and that the power blocks 2 and 4 supply steam to two desalination units 610 each. However, at any given time, any combination of desalination units 610 may be in operation and the power blocks that are running will be set to ensure that the IP and LP steam demands for these units are satisfied. This normal configuration also means that any or all of the valves 624 and 626 in the HP, IP and LP headers can be opened. As a result, as shown in Table 2 below, there are eight general equipment configurations possible due to the positions of the isolation valves 624 and 626 in the IP and LP headers (assuming that the isolation valves 614 always remain closed). Here, it is also assumed that the isolation valves 624 and 626 between the various subsections will be operated together such that the valves 624 and 626 between the first power section and the second power section are opened or closed together. Of course, this would not need to be true for all cases.

TABLE 2

| CONFIGURATION | PB1-PB2 | PB2-PB3 | PB3-PB4 |
|---|---|---|---|
| CASE 0 | OPEN | OPEN | OPEN |
| CASE 1 | OPEN | OPEN | CLOSED |
| CASE 2 | OPEN | CLOSED | OPEN |
| CASE 3 | OPEN | CLOSED | CLOSED |
| CASE 4 | CLOSED | OPEN | OPEN |
| CASE 5 | CLOSED | OPEN | CLOSED |
| CASE 6 | CLOSED | CLOSED | OPEN |
| CASE 7 | CLOSED | CLOSED | CLOSED |

Moreover, each HRSG 606 contains an SCR system to help reduce $NO_x$ emissions. Aqueous ammonia is automatically injected so that the amount of $NO_x$ produced meets the required setpoint. Typically, this setpoint is 9 ppm when a GTG 602 is run at greater than a 60% load. The optimization program run in the numerical solver operates to calculate the ammonia flow for each SCR unit and considers the ammonia cost in the objective function. Moreover, as illustrated in FIG. 11, the throttle for each STG unit 604 is fed from the HP header 612 and each STG 604 contains an IP and an LP steam extraction and a condenser. However, the STG 604 must be at 50% load or greater before the LP extraction can be taken into operation.

As illustrated in FIG. 11, the IP steam from all of the STGs 604 is fed into a common header 620. IP steam can also be produced in the header 620 by passing steam through pressure reducing stations PRVs 630. IP steam is sent to the desalination units 610 and some of the IP steam is required for turbine gland seal system, jet air ejector and de-aerator pegging during startup of the HRSGs 606 to reduce the startup time.

Likewise, the LP steam from all of the STGs 604 is fed into a common header 622. LP steam at the header 622 can also be obtained by passing HP steam through pressure reducing valves PRVs 632. The LP steam is also required for the desalination units 610.

In one example, the desalination plant 600 is designed for a net power output of 2730 MW and a net water capacity of 63 MIGD at the reference conditions listed below:
  Ambient Air Temperature—50 Deg C.
  Relative Humidity—35%
  Air Pressure—1013 mbar
  Altitude<10 m
  Seawater Supply temperature—35 Deg C.

The plant 600 can produce a net water capacity of 63 MIGD when the total LP steam supply flow is 1105 t/h (tons/hour) at a pressure of 3.2 bara with a temperature of 135.8 Degree C. Here, the seawater inlet temperature is 35 Degree C. The power plant 607 and the desalination plant 609 are interconnected even though they operate as separate units. A desalination unit 610 always runs between 60% to 100% load when it is on. The optimum loading is 100%. When a desalination unit 610 is in the 60% to 100% load range, the amount of IP steam it requires is 6.1 t/h. This amount remains constant over the load range. However, the LP steam demand varies but is directly proportional to the desalination unit water production. One desalination unit 610 at 100% water production equals 6.49 MIGD, and this load requires 110.5 t/h LP steam flow (10% of maximum). This linear relationship is used to calculate the amount of LP steam required by each desalination unit 610.

This plant application has some problems similar to the university example in that there are integer variables to determine which equipment should be on or off. Thus, the problem of binary variables is introduced into the optimization problem. However, there is another problem in this case caused by constraints. In particular, the plant 600 has an operational constraint that if two GTGs 602 in the same power block are on in combined cycle mode (i.e., both the GTG 602 and the associated HRSG 606 are on), then the GTGs 602 must be equally loaded, and the duct firing on the HRSGs 606 must also be equal. If both machines are not in combined cycle, then they can be run at different loads. Thus, the optimization system needs to know if the GTG 602 and HRSG 606 are both being run, and if so must set the different units in the same power block to deliver equal loads. If a traditional optimizer is used to determine which equipment should be turned on, it would be necessary to implement a conditional statement on the constraint depending on whether the optimizer decided to put both GTGs 602 and HRSGs 606 in a power block in combined cycle mode. However, it is impossible to have a conditional constraint in a traditional optimizer, as all constraints must be fixed before the solver starts running. Otherwise, the rules would be changing while the numerical solver ran, and the solver could never converge.

In this case, the expert system described herein can be used to provide logic that determines, before solving, if the two units in a power block should be in combined cycle mode or not. In this manner, the constraint can be determined prior to calling the numerical solver to perform a final optimization. In some cases, the expert system can have enough logic or rules to determine whether to use the combined cycle mode or not before calling the numerical solver. In other cases, the expert system may call the numerical solver once or twice or more times to determine whether it is better to use the combined cycle mode or not, and once having made that determination, call the numerical solver with a set of plant configuration parameters that implement the identified mode to determine an optimal plant operating point using that mode. Thus, in this case, the expert system can iteratively provide different plant configurations to the numerical solver, including configurations that use combined cycle mode and configurations that do not use combined cycle mode in various power blocks, to thereby steer the numerical solver to solve for a local optimum. The expert engine can thus first determine, by iteratively calling the numerical solver with different plant configurations that use combined cycle mode and those that do not, whether to run the plant using a combined cycle mode or not, given the current conditions and load demands. Thereafter, the expert system can have the numerical solver hone in on an optimal solution that either uses combined cycle mode or not, based on the results of the initial runs of the numerical solver which solves for or determines this general or initial plant configuration parameter. Alternatively, the expert system could store rules that enable it to determine, based on other conditions, such as plant conditions, ambient conditions, demands, etc., whether to run a particular power block in combined cycle mode or not and can then limit the solutions considered by the numerical solver to these plant configurations, thereby limiting the optimization problem solved by the numerical solver.

Figure 12:
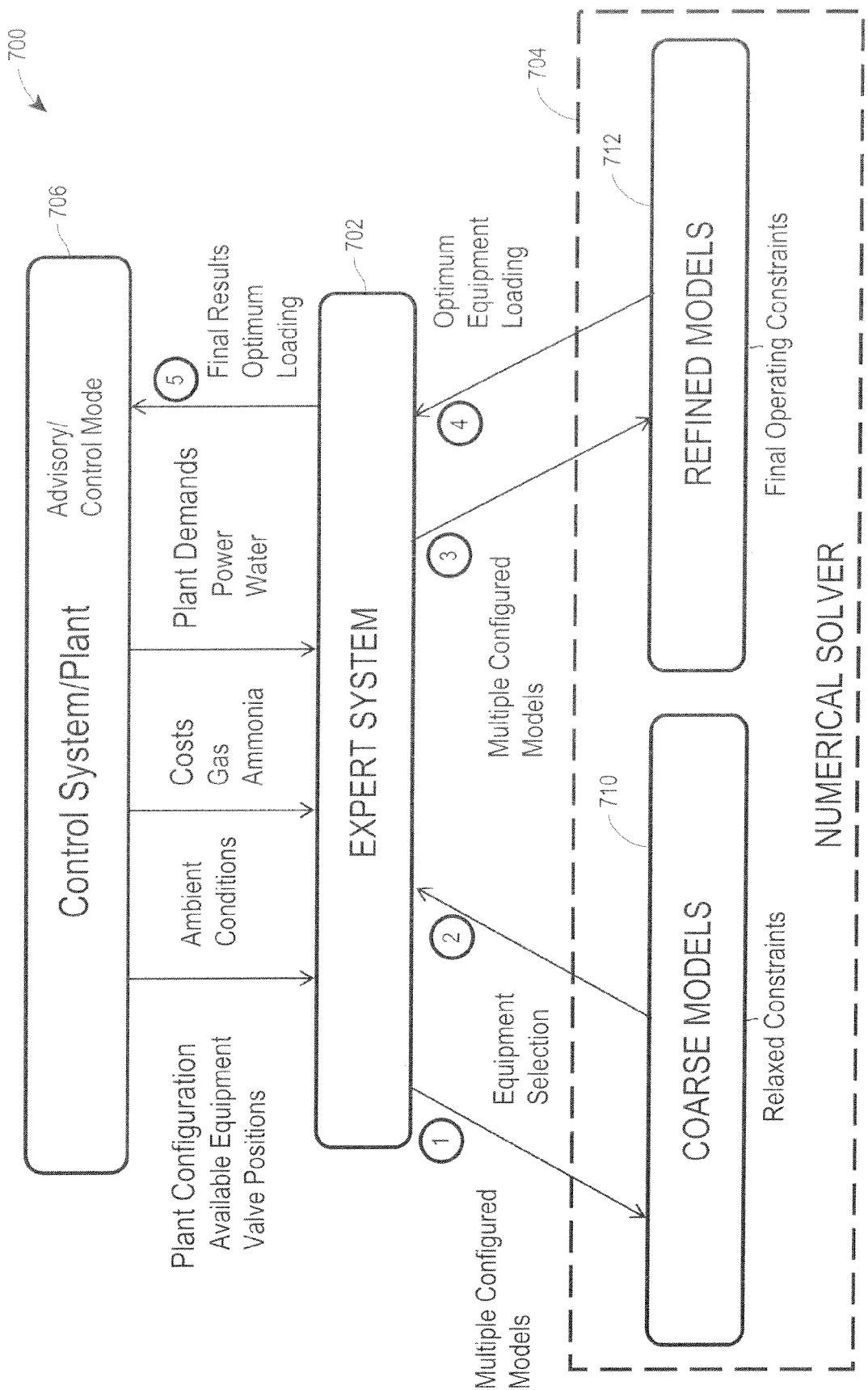
FIG. 12 is a block diagram of an example optimizer configuration, having an iteratively coupled expert engine and numerical solver, that uses multiple sets of plant models.
Figure 13:
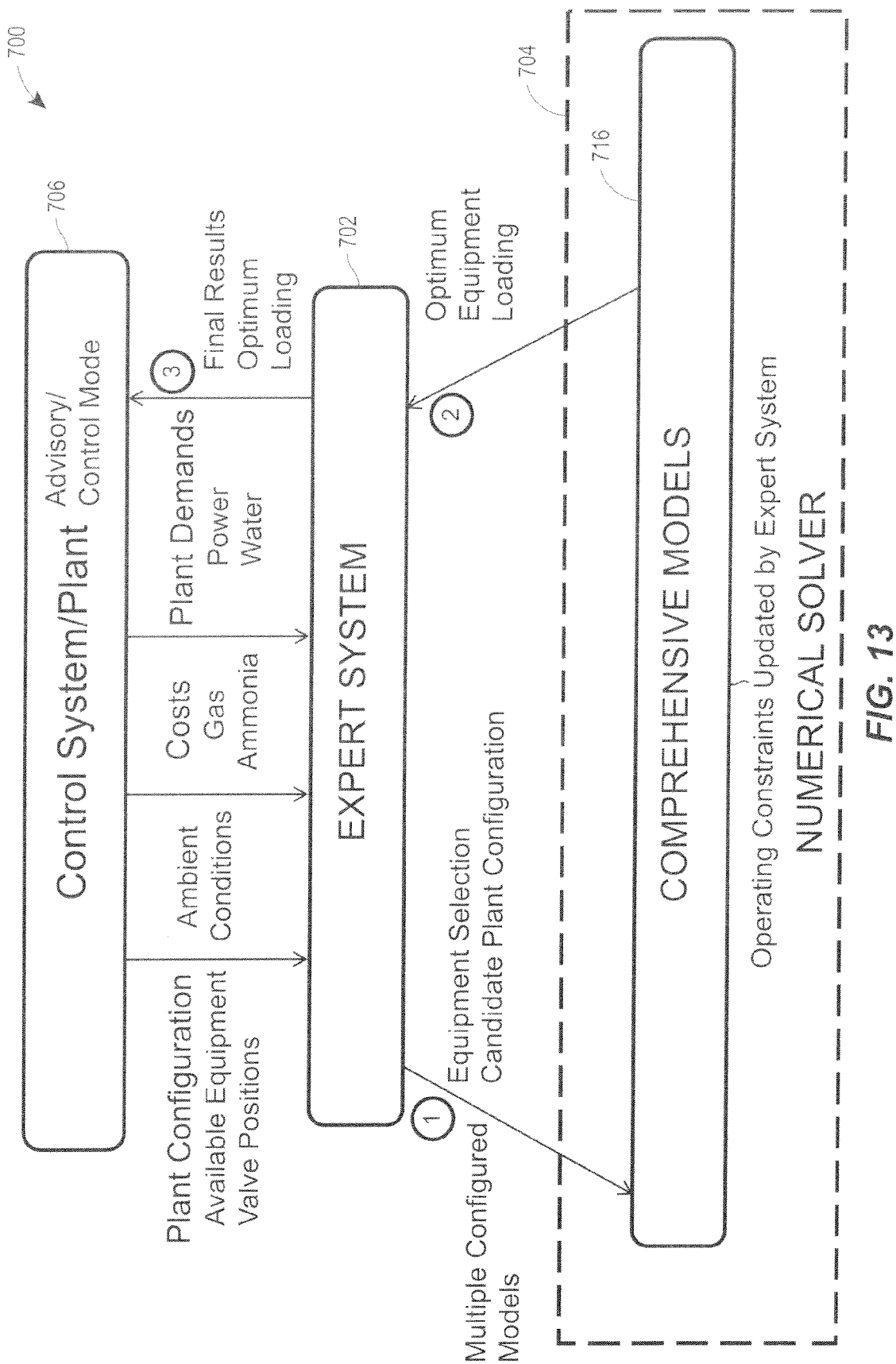
FIG. 13 is a block diagram of an example optimizer configuration, having an iteratively coupled expert engine and numerical solver, that uses a single comprehensive set of plant models.

FIGS. 12 and 13 illustrate two different methods of configuring an optimizer 700 having an expert system that iteratively calls a numerical solver to thereby implement the optimization techniques described above. As will be seen in FIGS. 12 and 13, the optimizer 700 includes an expert system 702 coupled to a numerical solver 704 and coupled to a plant operating system 706. The plant operating system 706, which may be a plant control system of any desired type (such as a distributed control system DCS), a user interface, etc., provides information in the form of the current plant configuration or plant conditions including, for example, plant settings, equipment conditions, e.g., valve positions or settings, which equipment is currently operational within the plant, etc. The control system 706 also provides the ambient plant conditions and cost information defining costs, such as the current ammonia costs, power grid costs, gas costs, and other material costs associated with the power generation equipment for running the desalinations units 110 of FIG. 11 to the expert system 702. Still further, the control system 706 provides the plant demands, such as the amount of desalinated water, power outputs, steam demand if needed, etc. to the expert system 702. The expert system 702 then uses this data to, for example, determine one or more local or non-global plant configurations to provide to the numerical solver 704 to analyze as part of determining a cost associated with that local plant setting or configuration.

For example, the expert engine 702 may provide the numerical solver 704 with a plant configuration that either uses a combined cycle mode in one or more of the power units or that does not do so as a plant configuration to optimize, or may set other on/off variables in the power units (defining whether certain equipments to be run or not). The expert system 702 may determine these configurations using rules which implement or define the operational constraints or interrelations described above that are applicable in the plant and based on general knowledge of how many power units must be run at a minimum to meet the minimum load demand. In any event, the numerical solver 704 may then optimize the plant configuration provided by the expert system considering each of the possible eight different models or settings of the isolation valves in the plant as defined in Table 2 to determine, in a generic manner, which setting or model is most optimal given the load demand and current plant configurations. The expert system 702 may, if desired, steer the numerical solver 704 to consider all or a subset of these possible configurations, if desired, to limit the optimization problem solved by the numerical solver in a single run. For example, the expert system 702 may know that certain equipment in one power block is not available for use or may know that certain desalination units 610 are not being run, and this information may limit the possible settings isolation valves of the plant 600 to a subset of those defined in Table 2. This operating then limits or constrains the mathematical workload of the numerical solver 704.

In any event, as illustrated in FIG. 12, the numerical solver 704 may include a plurality of process models including a set of coarse models 710 and a set of fine models 712. The course models 710 may, for example, be less precise or less accurate models, but may be easier to implement mathematically, while the fine models 712 may be more precise or accurate but may be more complex mathematically. For example, the coarse models 710 may be linear models or first order approximation models, while the fine models 712 may be non-linear models, such as second or third order models, complex first principle models, or any other type of model that accurately reflects operation of the plant equipment. Additionally or alternatively, the coarse and fine models 710 and 712 may differ in that they may be run using different constraints, with the coarse models 710 implementing looser or more relaxed constraints and the fine models 712 implementing stricter constraints. As will be understood, the use of different models in the numerical solver 704 during different iterations enables the numerical solver 704 to run faster or to find optimal solutions more easily in the initial stages of developing an overall optimal plant setting, and to use finer or more precise models in the later stages of the iterative optimization to provide for a more accurate final solution.

In the case of FIG. 12, the expert system 702 may iteratively provide different potential configurations or problems to be solved to the numerical solver 704 at different times and may receive the results of these optimization problems (as defined by the arrows marked 1 and 2). The expert system 702 may use the results of previous solver outputs to develop new or more precise constraints or plant equipment configurations in the subsequent calls of the numerical solver. For example, the expert system 702 may initially determine, via one or more calls to the numerical solver 704, whether it is better to use a combined cycle mode or not for the power equipment in one or more of the power sections of the power plant 600 and, once having made this determination, use subsequent calls to the numerical solver to hone in on a or to identify a particular plant equipment configuration that is optimal using the determined mode of the these power units. Likewise, the expert system 702 may provide more relaxed constraints in the initial calls to the numerical solver 704 and may, over time, tighten these constraints.

In particular, as illustrated by the arrows 3 and 4 in FIG. 12, the expert engine 702, upon developing a limited set of potential plant configurations to use, may determine which is best or what plant equipment settings to use based one or more calls to the numerical solver 702 that uses the finer models 712.

Of course, the expert system 702 may analyze the outputs of the numerical solver 704 using rules and actions to determine the actual plant settings (e.g., the exact plant equipment and the settings therefore) to implement the optimal configuration as determined by the expert system 702 and numerical solver 704. This post processing may take safety, equipment usage and other practical consideration into account when determining how to run the plant to implement an optimal solution.

In any event, the expert system 702 may ultimately provide the optimum plant loading configuration or settings to the plant control system 706 as indicated by the arrow 5. As indicated in FIG. 12, the plant controller or operating system 706 may be operated in an automatic mode in which it automatically implements the plant configuration or settings as provided by the expert system 702 or may be set in an advisory mode in which, for example, the final plant configuration provided by the expert system 702 (at arrow 5) is provided to a user to authorize before being implemented (e.g., so that the output of the expert system 702 is implemented in a manual mode or other non-automatic mode.)

An actual optimizer system was developed according to the principles described in conjunction with the optimizer 700 of FIG. 12, and this optimizer system was operated to optimize the operation of a combined cycle power plant and desalinization plant constructed according to the plant 600 illustrated in FIG. 11. In this case, the actual plant included both a power plant and a desalinization plant (as generally shown in FIG. 11), and had to satisfy both electrical power and water needs to produce a net power output of 2730 MW and a net water amount of 63 Million Imperial Gallons per Day (MIGD). The plant was connected to a national power grid and the purpose of the optimizer used in optimizing the operation of the plant was to determine the optimal operating mode for all of the steam and power producers of the power plant so that the steam required for the desalination units of the plant (which is a function of the water demand) and the power demand were satisfied at least cost. In the following descriptions, the components of the actual plant and optimizer will be referred to with the same reference numerals as those provided in FIGS. 11 and 12.

In this actual example, a fuel demand model (FDM) and an ammonia demand model (ADM) were included as models within the optimization system 700 and were generally set as fixed or pre-established models using known relationships in the operation of GTGs, STGs, and HRSGs. The optimization system 700 was run using a Windows® based computer operating system and communicated with the distributed control system (DCS) of the plant 600 (not shown in FIG. 11 but represented by the block 706 of FIG. 12) via Object Linking and Embedding for Process Control (OPC). All of the process values were measured and monitored in the DCS 706. All process data that was required by the optimization system 700 was received from the DCS 706 and the results of the energy optimization was sent to the DCS 706 where it was used in control logic or viewed on man-machine interface (MMI) displays.

General)y, the optimization system 700 in this example calculated the optimum fuel flows and loads for the steam and power producers of the Combined Cycle Power Plant (CPP) 607 which included the GTGs, STGs, and HRSGs of FIG. 11, so that the water and power demands of the plant 600 were satisfied at least cost. In order to do this, a model of the power plant 607 shown in FIG. 11 was created. As noted above, the power plant 607 of FIG. 11 includes four power blocks wherein each power block contains two Gas Turbine Generators (GTG), two Heat Recovery Steam Generators (HRSG) and a Steam Turbine Generator (STG). Each GTG has an inlet air evaporator that can be used to cool the compressor inlet air temperature thus increasing the MW capacity of the GTG. The hot exhaust of the GTG feeds the HRSG. Each HRSG has supplemental fuel firing so that extra fuel gas can be burnt to increase the amount of steam produced by the HRSG. The components and operating constraints of this actual plant were the same as those described above for the plant 600 of FIG. 11.

In this configuration, the controls of the power plant 607 were designed to operate as four independent power blocks where each power block operated to cater to the steam demand of the desalinization units 610 connected to it. Within a power block there could be different configurations of equipment. For example, there could be just one GTG/HRSG and STG running. It should be noted that an HRSG could not run unless the CTG was running, but the CTG could run without the HRSG. When the HRSG was on, the duct burner had to be on at a minimum load (1.7 T/h). Moreover, the STG in a power block could not run unless at least one of the CTG/HRSG units in the power block was on.

The power plant 607 and the desalination plant 609 were interconnected even though they operated as separate units. The power plant operational range varied for each power block due to different LP steam demands, as there were a different number of desalinization units 610 connected to each of the power plant blocks. The LP steam demand was directly proportional to the water production of the desalinization units 610 connected to the block. One desalinization unit 610 operating at 100% water production (Gross 6.49 MIGD) required an LP steam demand of 110.5 t/hr (10% of Maximum LP steam supply).

The plant 600 in this example was mainly designed for base load operation. However the power plant 607 and the desalination plant 609 had to operate at any combination of power (MW) demand and desalination water demand within the operational ranges of Table 3.

TABLE 3

| DESCRIPTION | OPERATIONAL RANGE |
|---|---|
| Power Load Range (NET Output) | 100%-15% (2730 MW-409.5 MW) |
| Desalination LP Steam Supply | 100%-70% (1105 t/h-773.5 t/h) |
| Desalination IP Steam Supply | 100%-70% (61 t/h-42.7 t/h) |

As a result, the plant 600 was basically configured for an 8+8+4+10 arrangement with STG block-wise concept (i.e., each STG unit being in a different power block) as set out in Table 4. In the discussion below, the desalinization units 610 are also referred to as multi-effect evaporator distillation (MED) units.

TABLE 4

| BLOCK | GTG | HRSG | STG | MED |
|---|---|---|---|---|
| 1 | 2 | 2 | 1 | 3 |
| 2 | 2 | 2 | 1 | 2 |
| 3 | 2 | 2 | 1 | 3 |
| 4 | 2 | 2 | 1 | 2 |

Within a power block, the configuration of equipment could vary on a block-by-block basis. For example the possible equipment configurations within any particular power block were allowed to take on any of the following six configurations as determined to be best or most optimum by the optimizer system 700:
1. 1 GTG+0 HRSG+0 STG configuration
2. 1 GTG+1 HRSG+0 STG configuration
3. 1 GTG+1 HRSG+1 STG configuration
4. 2 GTG+0 HRSG+0 STG configuration
5. 2 GTG+2 HRSG+0 STG configuration
6. 2 GTG+2 HRSG+1 STG configuration The Pressure Reducing Stations (PRS) in a power block could also be on or off as required by the optimizer 700. In this case, the most efficient manner to satisfy the IP and LP demands was using STG extraction. Moreover, the plant 600 was to be able to sell power to the grid as well as to produce fresh (desalinated) water. As a result, there were both a power and a water demand that had to be satisfied. The plant 600 received a total net megawatt (MW) power demand signal and a gross water demand signal for each MED unit that was in operation. The IP and LP steam demand required for the MED unit to make the water demand target was calculated, and the model ensured that the calculated IP and LP steam demands for each MED unit were satisfied.

In this case, each MED unit always ran between 60% to 100% load when it was on. The optimum loading was 100%. When an MED unit was in the 60% to 100% load range, it required 6.1 T/H of IP steam. This amount remained constant over the load range. However, the LP steam demand varied and was directly proportional to the MED water production. One MED at 100% water production resulted in 6.49 MIGD and this required 110.5 t/h LP steam flow (10% of maximum). This linear relationship was used to calculate the amount of LP steam required by each MED.

Moreover, in order for the optimization system 700 to be able to determine the optimum configuration of each power block, a model of the plant 600 was created. Generally speaking, in this case, the plant model included a number of types of variables including constants, manipulated variables, dependent variables and constraints, which are described in more detail below.

Constants are variables that are not modified during the optimization process. Examples of constants in the developed system included the cost of fuel, the heating value of fuel, the ambient temperature, the relative humidity, etc. These values generally varied in the DCS and thus were recognized by the optimizer 700 before each execution, but were not modified by the optimizer 700. As a result, constant type variables were measured or determined prior to the optimization process, but were treated as fixed once the optimization process or calculations began. Constants also included calculations that used other constants. An example included the maximum MW power that a GTG could produce. This value was set as a function of ambient conditions and whether the evaporator was on or off. Other examples of calculated constants included correction factors for power output on the GTGs and the STGs.

Manipulated variables are variables that the optimization routine 700 was able to adjust. Examples of manipulated variables included fuel flows, STG throttle and extraction flows, PRV flows, etc. The optimizer 700 was also able to select which pieces of equipment should be running. In one case of the designed system, the manipulated variables included the following specific variables (with the number of each of these variables in parentheses):
GTG fuel flows (8)
HRSG Duct Burner Fuel Flows (8)
STG throttle flows (4)
STG IP Extraction flows (4)
STG LP Extraction flows (4)
PRV (HP to LP) pressure reducing station steam flows (4)
PRV (HP to IP) pressure reducing station steam flows (4)
GTG—On/Off(8)
HRSG/Duct Burner—On/Off (8)
STG—On/Off(4)

Dependent variables are variables that are calculated from some combination of manipulated variables, constants, and other dependent variables. Examples of dependent variables included steam produced from the HRSGs, and power produced from the GTGs and the STGs. In particular, examples of the dependent variables included (with the number of each of these variables in parentheses):
GTG MW (8)
STG MW (4)
HRSG HP steam flow (8)
HRSG Ammonia flows (8)
Plant auxiliary power demand Constraints are rules that the optimizer had to follow when determining a valid solution. Examples of constraints included:
Min and Max STG MW (Determined by Operator)
Min and Max STG Throttle flow
Min and Max STG IP extraction flow
Min and Max STG LP extraction flow
Min and Max Duct Burner flow
Min and Max IP PRV flow
Min and Max LP PRV flow
Min and Max GTG MW (Determined by Operator)
If two GTG in a power block are on they must be equally loaded
If two HRSG's in a power block are on the duct burner fuel flows must be equal
Plant Net Power Demand
Plant Gross Water Production Moreover, the plant model contained individual equipment models for all of the steam and power producers. The specific equations used for the major components of the plant model are described below. In particular, each gas turbine (GTG) was modeled using an equation that calculates the heat from the gas flow as:

$$GTGHEAT = (GTG\_FF * LHV\_GAS * 0.001)$$

Where:
GTGHEAT=Heat in fuel (GJ/h)
GTG_FF=GTG Fuel Flow (T/h)
LHV_GAS=Lower Heating Value of Gas (kJ/kg)

The relationship between fuel and power for a GTG was determined from manufacturer design data. In this particular case, all of the data sets contained in the gas turbine expected performance data sheets of the manufacturer's documents or specifications were regressed to form the following relationship (in which A0-A3 and k are constants determined by the regression analysis):

$$GT\_MW = A0*GTGHEAT + A1*AMBTMP + A2*RELHUM + A3*EXHPRS + k$$

Where:
  GT_MW=Power produced (MW)
  GTGHEAT=Heat in GTG fuel (GJ/h)
  AMBTMP=Ambient Temperature (Deg C.)
  RELHUM=Relative Humidity (%)
  EXHPRS=Exhaust Pressure (mmH2O)

Likewise, the equipment models for the steam turbines (STGs) were derived from the data contained in a manufacturer's document entitled "Expected Steam Consumption Curve". Again, in this case, the data sets from the curves were taken and regressed to form a model in the following form (in which A0-A4 and k are constants determined by the regression analysis):

$$STG\_MW = A0*THR + A1*IPext + A2*LPext + A3*THR\_TMP + A4*EXHprs + k$$

Where:
  STG_MW=Power (MW)
  THR=Throttle Flow (T/h)
  IPext=IP Extraction Flow (T/h)
  LPext=LP Extraction Flow (T/h)
  THR_TMP=Throttle Temp (Deg C.)
  EXHprs=STG Exhaust Pressure (Bara)

The heat from the duct burner gas flow was calculated as:

$$DB\_HEAT = DB\_FF*LHV\_GAS*0.001$$

Where:
  DB_HEAT=Heat in fuel (GJ/h)
  DB_FF=Duct Burner Fuel Flow (T/h)
  LHV_GAS=Low heating value of gas (kJ/kg)

For the HRSGs, the manufacturer HRSG data tables were used to generate models for the HRSGs. All of the data sets were regressed to formulate the models for HP steam flow and ammonia flow as follows (in which A0-A3 and k are constants determined by the regression analysis):

$$HP\_STEAM = A0*GT\_MW + A1*DB\_HEAT + A2*AMB\_TMP + A3*REL\_HUM + k$$

Where:
  HP_STEAM=HRSG steam flow (T/h)
  GT_MW=GT MW
  DB_HEAT=Duct Burner fuel heat (GJ/h)
  AMB_TMP=Ambient temperature (Deg C.)
  REL_HUM=Relative Humidity (%)
and:

$$AMN\_FLOW = A0*GT\_MW + A1*DB\_HEAT + A2*AMB\_TMP + A3*REL\_HUM + k$$

Where:
  AMN_FLOW=Ammonia flow (T/h)
  GT_MW=GT MW
  DB_HEAT=Duct Burner fuel heat (GJ/h)
  AMB_TMP=Ambient temperature (Deg C.)
  REL_HUM=Relative Humidity (%)

Each HP to IP pressure reducing station was modeled as:

$$IP\_FLOW = A0*HP\_INLET\_FLOW$$

Each HP to LP pressure reducing station was modeled as:

$$LP\_FLOW = A0*HP\_INLET\_FLOW$$

In these equations, the A0 coefficient accounts for the increase in flow due to the spray water flow.

During the optimization, the design auxiliary power for the plant 600 was calculated in the expert system 702. In addition, the actual auxiliary power was calculated by subtracting the net power sold to the grid from the sum of the power (MWs) produced by the GTGs and the STGs. These two values were compared and if the difference between the two values was greater than 5 MW (which was a tunable value) an alarm was generated. If the difference between the two values was less than 5 MW, the maximum of the design and auxiliary power was used in the plant models. If the difference was greater than 5 MW the actual auxiliary power was used by the plant models. Also, in this case, all of the coefficients A0, A1, A2, A3, A4, A5 and k listed above for all individual equipment models were set and sent to the DCS and to data historian for storage.

As will be understood from FIG. 11, the plant 600 had both a power demand and a water demand that had to be satisfied. As noted above, the power demand was satisfied by the power produced from the GTGs and STGs. The distillate production was controlled on each MED unit 610 by the "unit production control system" (one dedicated to each MED) on which the operator set the amount of distillate flow to be produced by the desalination unit as per the required water production schedule. Each "unit production control system" defined the set point of the brine outlet temperature (TBT), according to the required distillate flow ate to be produced. The TBT set point was maintained by the LP steam control valve installed at each MED steam transformer inlet, which regulated the LP steam flow rate to the MED steam transformer.

The IP steam necessary for operating the MED ejector system was fed from the steam turbine IP extraction steam line through the IP steam header. The IP steam header pressure was controlled by the steam turbine IP extraction steam control valve and the HP/IP steam reducing valve. The IP steam was also used for the steam turbine gland seal steam supply, steam jet air ejector and de-aerator.

The optimizer 700 constructed for this plant used the calculated IP and LP steam demands for each MED unit as constraints, just like the net power demand of the plant is a constraint. Rather than looking at water demand, the optimization ensured that the current power, IP and LP steam demands for each MED were satisfied. The steam demands were of course a function of the amount of water being produced on each MED. The optimizer ensured that the equipment was loaded (run) in such a manner to ensure that the amount of IP and LP steam required by the desalination units (MEDS) and the power required for sale to the grid was met. This working constraint was expressed as:

$$GPWR = GTG11PWR + GTG12PWR + GTG21PWR + GTG22PWR + GTG31PWR + GTG32PWR + GTG41PWR + GTG42PWR + STG13PWR + STG23PWR + STG33PWR + STG43PWR$$

Where:
  GPWR=Gross Power
  NPWR=GPWR−AUX_PWR
And where:
  NPWR=Net Power
  AUX_PWR=is the current auxiliary power demand of the plant calculated as discussed above.

In order to satisfy the water demand of the plant 600, the LP and IP steam demands of the plant 600 had to be satisfied. In this case, it was assumed that any combination of MED units were able to be on and the power blocks that were in operation had to satisfy the total IP and LP steam demands. The positions of the IP/LP block valves determined the constraints for these headers. The equations shown below were used for the demands when all the IP/LP valves are open.

$$STG13\_LP\_EXT+STG23\_LP\_EXT+\\STG33\_LP\_EXT+STG43\_LP\_EXT+\\U1\_HP\_LP\_PRV+U2\_HP\_LP\_PRV+\\U3\_HP\_LP\_PRV+U4\_HP\_LP\_PRV-\\10(\Sigma(MED\_LP\_FLOW_i)=0\ I=1$$

Where:
STG13_LP_EXT=STG13 LP Extraction Flow
STG23_LP_EXT=STG23 LP Extraction Flow
STG33_LP_EXT=STG33 LP Extraction Flow
STG43_LP_EXT=STG43 LP Extraction Flow
U1_HP_LP_PRV=Power block 1 HP to LP PRV flow
U2_HP_LP_PRV=Power block 2 HP to LP PRV flow
U3_HP_LP_PRV=Power block 3 HP to LP PRV flow
U4_HP_LP_PRV=Power block 4 HP to LP PRV flow
MED_LP_FLOW$_i$=LP Steam required by MED Unit i
and:

$$STG13\_IP\_EXT+STG23\_IP\_EXT+STG33\_IP\_EXT+\\STG43\_IP\_EXT+U1\_HP\_IP\_PRV+\\U2\_HP\_IP\_PRV+U3\_HP\_IP\_PRV+\\U4\_HP\_IP\_PRV-10\ (\Sigma(MED\_IP\_FLOW_i)=0\\I=1$$

Where:
STG13_IP_EXT=STG13 IP Extraction Flow
STG23_IP_EXT=STG23 IP Extraction Flow
STG33_IP_EXT=STG33 IP Extraction Flow
STG43_IP_EXT=STG43 IP Extraction Flow
U1_HP_IP_PRV=Power block 1 HP to IP PRV flow
U2_HP_IP_PRV=Power block 2 HP to IP PRV flow
U3_HP_IP_PRV=Power block 3 HP to IP PRV flow
U4_HP_IP_PRV=Power block 4 HP to IP PRV flow
MED_IP_FLOW$_i$=IP Steam required by MED Unit i In this optimization problem, the costs in the plant 600 were for fuel and ammonia. The fuel cost was applied to all fuel flows and the ammonia cost was applied to the ammonia flows for each SCR. The objective function used in the numerical solver 704 was selected to find a solution that satisfies the power and steam demands at least cost. The objective function used can be summarized as follows:

$$\text{Minimize}\left(\sum_{i=1}^{n}(fc*GTG\_HEAT_i)+\sum_{i=1}^{n}(fc*HRSG\_HEAT_i)+\sum_{i=1}^{n}(ac*SCR\_AF_i)\right)$$

Where:
fc=Cost of Fuel (QR/GJ)
ac=Ammonia cost (QR/T)
GTG_HEAT=Heat flow on GTG
HRSG_HEAT=Heat flow on HRSG
SCR_AF=Ammonia flow for SCR
n=8 (number of GTG/HRSG units)

It should be noted that minimum cost is achieved by finding the equipment loading that minimizes fuel consumption and therefore minimizes the plant heat rate.

Figure 14:
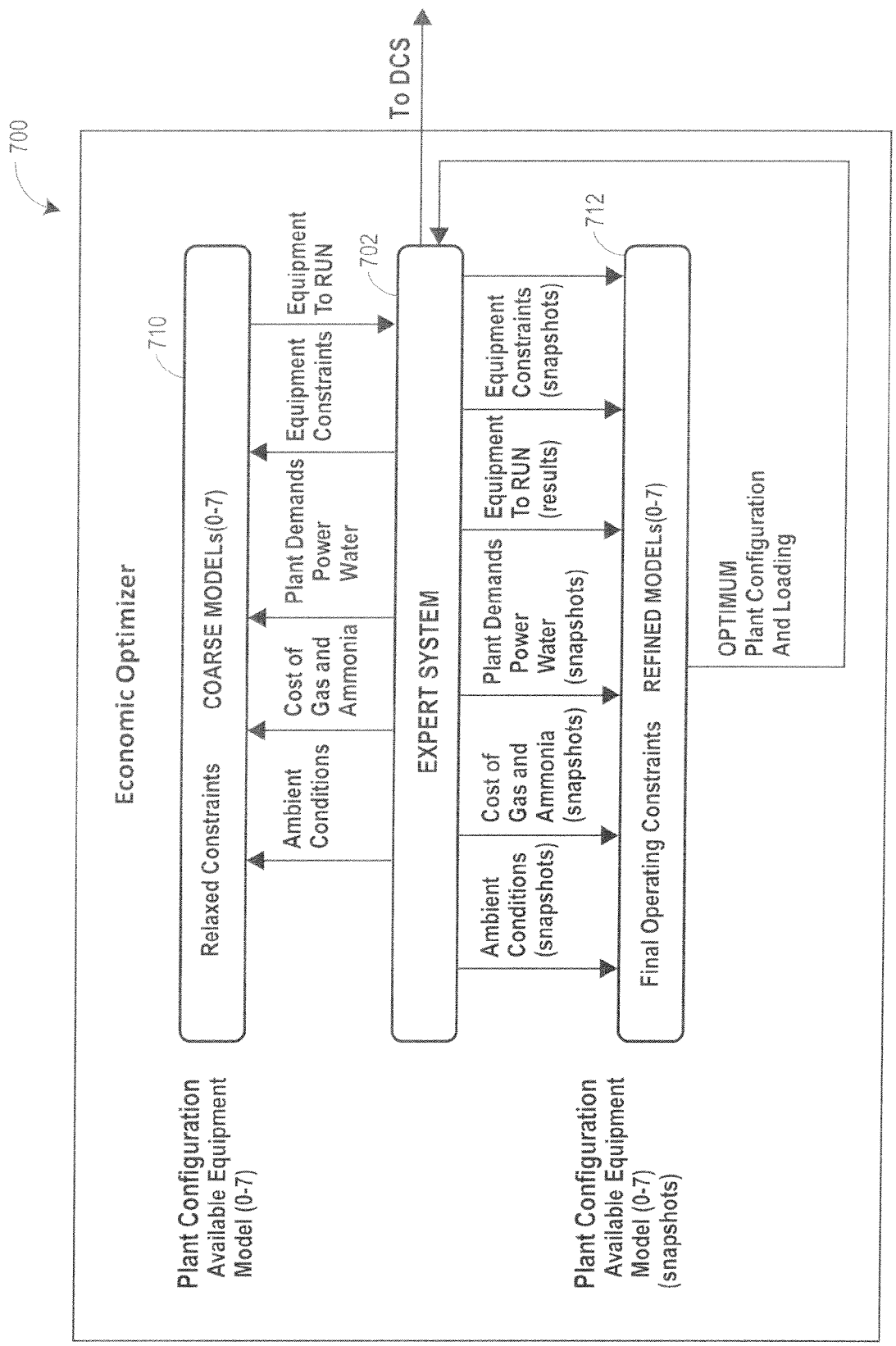
FIG. 14 is a block diagram of an example optimizer configuration of FIG. 12 illustrating data flow between an expert system and multiple models implemented by a numerical solver during an iterative optimization process.

The expert system 702 had to first determine the optimal plant configuration (using one or more of the coarse models 710) using the numerical solver 704 and then had determine the optimum loading for an identified optimal plant configuration (using one or more of the refined models 712), and thus iteratively applied models within the numerical solver 704 of FIG. 12 to perform optimization. The flow of the data between the expert system 702 and the models 710 and 712 during this iterative optimization procedure is illustrated in more detail FIG. 14.

Generally speaking, the expert system 702 was responsible for reading live data from the DCS, input data validation, controlling the sequencing and execution of the coarse and refined models and evaluating the results of the coarse and refined models, determining the final results and writing of results to the DCS. In particular, the expert system 702 read the process values from the DCS and verified that the values were within normal operating range. If a measured signal was bad or outside the normal operating range, the expert system 702 generated an alarm and used an operator entered substitute value or a calculated value in place of the live signal. When all of the required DCS inputs for the coarse model 710 were read and verified, the expert system 702 invoked the coarse model 710. After the coarse model 710 executed (in the numerical solver 704), the results were returned to the expert system 702. The expert system 702 evaluated the results of the coarse model 710 and checked the feasibility of the solution. If a feasible solution was found, the expert system 702 took the equipment configuration determined from the coarse model 710 (using the current objective function) and passed that information plus the process values from the DCS to the refined model 712. If the refined model 712 then operated and developed a feasible solution, the loading of the equipment calculated by this model became the final result and the expert system 702 wrote those values to the DCS. If an infeasible solution resulted from executing a plant model (coarse or refined), the expert system 702 generated an alarm and this status was displayed to the operator informing the operator that some of the constraints cannot be satisfied. The operator was able to view displays on the DCS system that aided the operator in determining why the solution was not feasible and/or in taking corrective action.

As will be understood, the purpose of the coarse model 710 was to determine the general plant configuration to use at any particular time. The coarse model 710 for example, determined which power and steam producers to turn on to satisfy the steam and power demands at any particular time. The coarse model 710 received the current ambient conditions, fuel costs, equipment constraints, etc. to make this determination, but had fewer constraints than the refined model 712. In this case, for example, the coarse model 710 did not enforce the equal loading of two gas turbines and the two HRSGs within a power block. In addition the coarse model 710 calculated the power on the GTGs without considering exhaust pressure. These were minor factors that did not affect the equipment configuration selection, and the absence of these constraints enabled the coarse model 710 to run more quickly than the refined model 712.

After the coarse model 710 ran to determine the optimum equipment configuration, the optimum equipment configuration was fed by the expert system 702 into and used by the refined model 712. The refined model 712 contained all the operating constraints and the final forms of all of the equipment models. The refined model 712 produced the results of the economic optimizer in the form of the plant equipment settings to use in running the optimal equipment configuration determined by the coarse model 710. The refined model contained all of the constraints and equipment models that are in the FDM/ADM model.

The inputs used in the coarse/first pass model 710 are provided in Table 5 below:

TABLE 5

| VARIABLE DESCRIPTION | ENG UNITS |
| --- | --- |
| Low Heating Value of Gas | kJ/kg |
| Ambient Temperature | Deg C. |
| Relative Humidity | Percent |
| Ambient Pressure | Mbar |
| Plant Frequency | Hz |
| Plant Net Power Demand | MW |
| Plant Auxiliary Power | MW |
| GTG11-GTG42 Evap On Status | ON (1)/OFF (0) |
| GTG11-GTG42 Available Status | YES (1)/NO (0) |
| HRSG11-HRSG42 Available Status | YES (1)/NO (0) |
| STG13-STG43 Available Status | YES (1)/NO (0) |
| PRV1-PRV4 IP Available Status | YES (1)/NO (0) |
| PRV1-PRV4 LP Available Status | YES (1)/NO (0) |
| GTG11-GTG42 Min Power | MW |
| GTG11-GTG42 Max Power | MW |
| STG13-STG43 Min Power | MW |
| STG13-STG43 Max Power | MW |
| STG13-STG43 Throttle Temp | Deg C. |
| STG13-STG43 Exhaust Pressure | Bara |
| MED1-MED10 Running Status | ON (1)/OFF (0) |
| MED1-MED10 Water Demand | MIGD |

The availability status of the equipment were defined by the operator. A piece of equipment was unavailable if it could not be used. The operator also defined the minimum and maximum power (MW) ranges for the GTG's and STG's.

The inputs used in the refined/second pass model 712 are provide in Table 6 below:

TABLE 6

| VARIABLE DESCRIPTION | ENG UNITS |
| --- | --- |
| Low Heating Value of Gas - Snapshot from coarse model | kJ/kg |
| Ambient Temperature - Snapshot from coarse model | Deg C. |
| Relative Humidity - snapshot from coarse model | Percent |
| Ambient Pressure - snapshot from coarse model | mbar |
| Plant Frequency - snapshot from coarse model | Hz |
| Plant Net Power Demand - snapshot from coarse model | MW |
| Plant Auxiliary Power - snapshot from coarse model | MW |
| GTG11-GTG42 Evap On Status - snapshots from coarse model | ON (1)/OFF (0) |
| GTG11-GTG42 ON Status - calculated by the coarse model | YES (1)/NO (0) |
| GTG11-GTG42 Exhaust Pressure | mmH2O |
| GTG11-GTG42 Generator Efficiency | Percent |
| GTG11-GTG42 Eff Diff due to PF | Percent |
| HRSG11-HRSG42 ON Status - calculated by the coarse model | YES (1)/NO (0) |
| STG13-STG43 ON Status - calculated by the coarse model | YES (1)/NO (0) |
| PRV1-PRV4 IP Available Status - snapshot from coarse model | YES (1)/NO (0) |
| PRV1-PRV4 LP Available Status - snapshot from coarse model | YES (1)/NO (0) |
| GTG11-GTG42 Min Power - snapshot from coarse model | MW |
| GTG11-GTG42 Max Power - snapshot from coarse model | MW |
| STG13-STG43 Min Power - snapshot from coarse model | MW |
| STG13-STG43 Max Power - snapshot from coarse model | MW |
| STG13-STG43 Throttle Temp - snapshot from coarse model | Deg C. |
| STG13-STG43 Exhaust Pressure - snapshot from coarse model | bara |
| MED1-MED10 Running Status - snapshot from coarse model | ON (1)/OFF (0) |
| MED1-MED10 Water Demand - snapshot from coarse model | MIGD |
| PRV1-PRV4 IP Spray Flow Coefficient | Ratio |
| PRV1-PRV4 LP Spray Flow Coefficient | Ratio |

The economic optimizer 702 had two modes of operation, offline and online. In the offline mode, the optimizer software was essentially used as a general purpose solver for the mixed integer linear/nonlinear optimization problems raised as a result of power plant operations. The optimizer software provided the user with abilities to find a solution of x (e.g., a vector of independent decision variables) in the feasible regions (which were determined by a set of equality/inequality constraints), such that the local or global minimum (or maximum) value of the objective function J, which is a function of x, was obtained. The mathematical form of the optimization problem can be stated as:

$$\operatorname*{Min}_{x} J = f(x)$$

$$s.t. \begin{cases} g(x) \le 0 \\ h(x) = 0 \\ x_{i,min} \le x_i \le x_{i,max} \end{cases}$$

where $x_i$ is either an integer or a real number.

To construct an optimization problem for the optimizer software to solve, all of the coefficients in f(x), g(x), and h(x) needed to be specified. Different values of those coefficients determined different cases or scenarios of the same optimization problem. For example, in the economic dispatch problem, when the power demand (most likely a coefficient in g(x) or h(x)) was changed, the optimal solution of x could be changed, and as a result, the optimization problem needed to be solved again. The new power demand coefficient could be changed manually in the offline calculation.

The offline mode of the optimizer 700 allowed the user to build different plant models so that "what if" analysis could be performed. With the offline optimizer program, the user manually entered costs, steam demands, power demands, took equipment out of service, etc. This could all be accomplished without effecting the operation of the plant. The offline mode could be used to build the plant model that would then be used by the online optimizer 700. In this case, the model represents the existing plant. However, this model was run in an offline mode by manually entering plant demands and costs to ensure the model was correct. Moreover, this model could be run with manually entered projected steam and electrical demands to provide recommended equipment selection and loadings to operators.

Of course, in the offline mode, models could be built that do not reflect the actual plant configuration. These other models might be used to determine if it is desirable or useful to modify a plant in some manner. For example, a model might be built that contains an extra GTG/HRSG or condensing STG to see if selling power is economically wise.

In one embodiment, the optimization software can be loaded onto one PC and this becomes the server. The offline interface can be run from any PC that has a network connection to the server. The offline optimizer program can then be run from the client PCs using a web browser. The IP address of the sever is entered into the address bar and the interface is displayed.

In the online mode, the economic dispatch program or optimizer 700 runs to actually operate a plant, as the plant is currently set-up or configured. In the case of the system of FIG. 11, there will be eight coarse/first pass models and eight refined/second pass models in memory at all times. Based on the configuration of the block valves in the IP and LP steam headers, only one model of each group will ever be active at a time. When the drop where the optimizer 700 resides is reset a Windows service could launch all 16 models. In the online mode, the coarse model 710 executes first and once it runs, the results from the coarse model 710 are used by the refined model 712. There is of course, logic in the expert system 702 that controls the execution sequence of the models 710 and 712.

The optimizer of FIG. 13 is similar but slightly different than that of FIG. 12 in that a single set of comprehensive models 716 are used in the numerical solver 704 instead of a set of coarse and fine models. In this case, the expert system 702 may change constraints of the models 716 during one or more different iterations to steer or hone in on a final optimal solution. Generally speaking, in the configuration of FIG. 13, the expert engine 702 may store enough logic be able to perform enough preprocessing of the plant data to limit the optimization problem so that only one call to the numerical solver is necessary. This example is illustrated by the arrows 1 and 2, wherein at arrow 1 the expert system 702 provides a set of preprocessed data as inputs to the numerical solver, which limits the optimization problem to be solved by the optimizer so that there are only a limited number of binary variables to be considered and so that there are no conditional statements. In this case, the numerical solver 704 can run once to find an optimal solution and provide this solution to the expert engine 702 (at arrow 2). The expert system 702 then performs post-processing on this returned data to develop a practical or actual solution for running the plant, which is provided to the plant control system at the arrow 5.

As will be understood, the models 710, 712 and 716 can be determined in any manner, including using immunological methods, neural network methods, statistical methods, regression analysis methods, etc. Moreover, combining an expert system with a numerical solver and using the numerical solver as a callable routine as described above allows for complex optimization problems to be easily constrained by expert system knowledge, and provides for optimization in an manner that may change and develop solutions in a practical manner, and that is able to develop and incorporate changes into an optimal solution quickly. Thus, the approach described herein enables the expert engine to scrutinize the results of the numerical solver so that decisions can be refined and constrained, and to use new inputs to determine additional dependent process decisions over time during the optimization process.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A configuration system for use in configuring an operation of a plant having a set of interconnected plant equipment, wherein the plant equipment includes multiple sets of energy production units that can be run separately or together to produce energy, the configuration system comprising:

a non-transitory computer readable memory that stores a plurality of equipment models that model the operation of the plant equipment and an objective function defining optimal operation of the interconnected plant equipment, wherein the non-transitory computer readable memory stores first and second different equipment models for the enemy production units;

a numerical solver that operates on a computer processing device using the objective function, the plurality of equipment models and a set of plant configuration input criteria to determine an optimal operating configuration of the set of interconnected plant equipment by determining an operational configuration of the set of interconnected plant equipment that minimizes or maximizes the objective function; and an expert engine that operates on a computer processing device to determine one or more operating values for use in running the plant equipment, wherein the expert engine calls the numerical solver a plurality of times to determine the one or more operating values for use in running the plant equipment, and wherein the expert engine provides the numerical solver a different set of plant configuration input criteria during each of the calls, wherein the numerical solver uses the first equipment model for one or more of the energy production units during a first call from the expert engine and uses the second equipment model for one or more of the energy production units during a second call from the expert engine.

2. The configuration system of claim 1, wherein the objective function determines an economic cost of running the energy production units to produce a needed amount of energy.

3. The configuration system of claim 1, wherein the first equipment model for the one or more energy production units is less accurate but less computationally expensive than the second equipment model for the one or more energy production units.

4. The configuration system of claim 1, wherein the first equipment model for the one or more energy production units is less constrained than the second equipment model for the one or more energy production units.

5. The configuration system of claim 1, wherein the expert engine provides a first set of operational constraints to the numerical solver as the plant configuration input criteria for one or more pieces of the plant equipment during the first call to the numerical solver and provides a second set of operational constraints to the numerical solver as the plant configuration input criteria during the second call to the numerical solver, wherein the second set of operational constraints are less relaxed than the first set of operational constraints.

6. The configuration system of claim 1, wherein the expert engine provides a set of ambient conditions, plant equipment operating costs, energy demands and equipment constraints to the numerical solver as the plant configuration input criteria during each of a first call and a second call to the numerical solver.

7. The configuration system of claim 6, wherein the expert engine provides the same set of ambient conditions, plant equipment operating costs, and energy demands as the plant configuration input criteria during each of the first call and the second call to the numerical solver but provides a different set of equipment constraints to the numerical solver during the first call and the second call to the numerical solver.

8. The configuration system of claim 6, wherein the expert engine provides the same set of ambient conditions, plant equipment operating costs, and energy demands as the plant configuration input criteria during each of the first call and the second call to the numerical solver but provides a subset of equipment to use as constraints to the numerical solver during the second call to the numerical solver.

9. The configuration system of claim 1, wherein the numerical solver uses the objective function to determine an optimal set of plant equipment to use during a first call to the numerical solver, and wherein the expert engine provides the optimal set of plant equipment to the numerical solver in a second call to the numerical solver and wherein the numerical solver uses the objective function to determine an optimal set of equipment operational parameters for the optimal set of plant equipment during the second call to the numerical solver.

10. The configuration system of claim 9, wherein the numerical solver uses a first set of equipment models during the first call from the expert engine and uses a second and different set of equipment models during the second call from the expert engine, wherein the second set of equipment models are more accurate than the first set of equipment models.

11. The configuration system of claim 9, wherein the numerical solver uses a first set of operational constraints in response to the first call from the expert engine and uses a second and different set of operational constraints during the second call from the expert engine, wherein the second set of operational constraints are less relaxed than the first set of operational constraints.

12. The configuration system of claim 1, wherein the expert engine provides ambient conditions, plant operating costs, and plant demands as the plant configuration input criteria during a first call to the numerical solver, wherein the numeral solver determines an optimal set of the plant equipment to use to meet the plant demands based on the objective function during the first call to the numerical solver, and wherein the expert engine provides ambient conditions, plant operating costs, and plant demands and an indication of the optimal set of plant equipment to use to meet the plant demands during a second call of the numerical solver, and wherein the numerical solver determines a set of optimal operational settings for the optimal set of plant equipment during the second call to the numerical solver.

13. The configuration system of claim 12, wherein the numerical solver uses different equipment models for the same plant equipment during the first and second calls to the numerical solver.

14. The configuration system of claim 12, wherein the numerical solver uses different sets of equipment operational constraints during the first and second calls to the numerical solver.

15. The configuration system of claim 1, wherein the objective function has parameters that consider costs of energy creation and usage of the plurality of energy production units associated with operational configurations of the energy production units.

16. The configuration system of claim 1, wherein the expert engine uses an output of numerical solver from a first call to the numerical solver to determine one or more of the plant configuration input criteria for use in a second call to the numerical solver.

17. The energy management system of claim 1, wherein the numerical solver receives a set of constraints associated with operating limits of plant equipment including each of the energy production units, and wherein the numerical solver determines different operational configurations of the energy production units as plant operating points that do not violate any of the set of constraints.

18. An energy management system for use in operating a plant having a plurality of energy producing units coupled to one or more loads, the energy management system comprising:
an expert engine that operates on a computer processing device to determine different sets of input plant operating configuration criteria for operating the energy producing units, wherein the expert engine uses the different sets of input plant operating configuration criteria to determine a final optimal operating configuration of the plurality of energy producing units; and
a numerical solver coupled to the expert engine, the numerical solver including an objective function and a set of equipment models for the energy producing units, wherein the numerical solver operates on a computer processing device to determine an optimal plant operating configuration by modeling the plant operation at a number of different operating configurations based on a particular set of input plant operating configuration criteria and determining one of the number of different operating configurations that best meets the objective function, wherein the objective function considers costs of energy creation and usage of the plurality of energy producing units;
wherein the expert engine calls the numerical solver multiple times, provides the numerical solver with a different set of input plant operating configuration criteria during each call of the numerical solver and determines the final optimal operating configuration of the plurality of energy producing units based on the optimal plant operating configurations determined by the numerical solver during the calls, wherein the numerical solver uses a first equipment model for one or more of the enemy production units during a first call from the expert engine and uses a second equipment model for one or more of the enemy production units during a second call from the expert engine.

19. The energy management system of claim 18, further including a control system having one or more controllers that control an operation of the plurality of energy producing units, wherein the expert engine provides signals based on the final optimal operating configuration to the control system to use in controlling the operation of the plurality of energy producing units.

20. The energy management system of claim 18, further including a user interface device and wherein the expert engine provides signals indicative of the final optimal operating configuration to a user via the user interface device.

21. The energy management system of claim 18, wherein the numerical solver uses the equipment models to predict an operation of the plant at each of the different operating configurations based on a particular set of input plant operating configuration criteria.

22. The energy management system of claim 18, wherein the numerical solver receives a set of constraints associated with operating limits of plant equipment including each of the plurality of energy producing units, and wherein the numerical solver determines the optimal plant operating configuration as a plant operating point that does not violate any of the set of constraints.

23. The energy management system of claim 18, wherein the expert engine determines the different sets of input plant operating configuration criteria based on rules within the expert engine and provides the determined different sets of input plant operating configuration criteria to the numerical solver.

24. The energy management system of claim 18, wherein the numerical solver receives a set of constraints associated with operating limits of plant equipment, a set of environmental conditions associated with operation of the plant equipment and a load requirement of the plant, and wherein the numerical solver determines the optimal plant operating configuration as a plant operating point at which the plant operates at the environmental conditions to produce the load requirement without violating any of the set of constraints.

25. The energy management system of claim 18, wherein the objective function specifies a manner of evaluating a plant operating point as a point that minimizes the economic costs of energy creation and usage of the plurality of energy producing units in the plant.

26. The energy management system of claim 18, wherein the objective function specifies a manner of evaluating a plant operating point as a point that minimizes the economic costs of energy creation and usage of the plurality of energy producing units in the plant over a specific period of time.

27. The energy management system of claim 18, wherein the first equipment model for the one or more of the energy producing units is less accurate but is less computationally expensive than the second equipment model for the one or more energy producing units.

28. The energy management system of claim 18, wherein the first equipment model for the one or more of the energy producing units is less constrained than the second equipment model for the one or more of the energy producing units.

29. The energy management system of claim 18, wherein the expert engine provides a first set of operational constraints to the numerical solver as a set of input plant operating configuration criteria for one or more pieces of the plant equipment during the first call to the numerical solver and provides a second set of operational constraints to the numerical solver as a set of input plant operating configuration criteria during the second call to the numerical solver, wherein the second set of operational constraints are less relaxed than the first set of operational constraints.

30. The energy management system of claim 18, wherein the expert engine provides the same set of ambient conditions, plant equipment operating costs, and energy demands as the set of input plant operating configuration criteria during each of the first call and the second call to the numerical solver but provides a different set of equipment constraints to the numerical solver during the first call and the second call to the numerical solver.

31. The energy management system of claim 18, wherein the expert engine provides the same set of ambient conditions, plant equipment operating costs, and energy demands as the set of input plant operating configuration criteria during each of the first call and the second call to the numerical solver but provides a subset of equipment to use as constraints to the numerical solver during the second call to the numerical solver.

32. The energy management system of claim 18, wherein during a first call to the numerical solver, the numerical solver uses the objective function to determine an optimal set of plant equipment to use and wherein during a second call to the numerical solver the expert engine provides the optimal set of plant equipment to the numerical solver and the numerical solver uses the objective function to determine an optimal set of equipment operational parameters for the optimal set of plant equipment.

33. The energy management system of claim 32, wherein the numerical solver uses a first set of equipment models during the first call from the expert engine and uses a second and different set of equipment models during the second call from the expert engine, wherein the second set of equipment models are more accurate than the first set of equipment models.

34. The energy management system of claim 32, wherein the numerical solver uses a first set of operational constraints in response to the first call from the expert engine and uses a second and different set of operational constraints during the second call from the expert engine, wherein the second set of operational constraints are less relaxed than the first set of operational constraints.

35. The energy management system of claim 32, wherein the numerical solver uses different equipment models for the same plant equipment during the first and second calls to the numerical solver.

36. The energy management system of claim 32, wherein the numerical solver uses different sets of equipment operational constraints during the first and second calls to the numerical solver.

37. The energy management system of claim 32, wherein the expert engine uses an output of numerical solver from a first call to the numerical solver to determine one or more of the set of input plant operating configuration criteria for use in a second call to the numerical solver.

38. A method of configuring an operation of a plant having a set of interconnected plant equipment, wherein the plant equipment includes multiple sets of energy production units that can be run separately or together to produce energy, the method comprising:
  storing on a computer device a plurality of equipment models that model the operation of the plant equipment and an objective function defining optimal operation of the interconnected plant equipment including storing first and second different equipment models for the energy production units;
  determining one or more operating values for use in running the plant equipment by calling via a computer device a numerical solver a plurality of times to determine one or more operating values for use in running the plant equipment, including providing the numerical solver different plant configuration input criteria during each of the calls and using the first equipment model for one or more of the enemy production units during a first call of the numerical solver and using the second equipment model for one or more of the energy production units during a second call of the numerical solver; and
  during each of the calls, using the objective function, the plurality of equipment models and a set of plant configuration input criteria to determine an optimal operating configuration of the set of interconnected plant equipment by determining an operational configuration of the set of interconnected plant equipment that minimizes or maximizes the objective function.

39. The method of configuring the operation of a plant of claim 38, wherein using the objective function includes using an objective function that determines an economic cost of running the energy production units to produce a needed amount of energy.

40. The method of configuring the operation of a plant of claim 38, wherein the first equipment model for the one or more of the energy production units is less accurate but less computationally expensive than the second equipment model for the one or more of the energy production units.

41. The method of configuring the operation of a plant of claim 38, wherein the first equipment model for the one or more of the energy production units is less constrained than the second equipment model for the one or more of the energy production units.

42. The method of configuring the operation of a plant of claim 38, wherein providing the numerical solver different plant configuration input criteria during each of the calls includes providing a first set of operational constraints to the numerical solver as the plant configuration input criteria for one or more pieces of the plant equipment during a first call to the numerical solver and providing a second set of operational constraints to the numerical solver as the plant configuration input criteria during a second call to the numerical solver, wherein the second set of operational constraints are less relaxed than the first set of operational constraints.

43. The method of configuring the operation of a plant of claim 38, wherein providing the numerical solver different plant configuration input criteria during each of the calls includes providing a set of ambient conditions, plant equipment operating costs, energy demands and equipment constraints to the numerical solver as the plant configuration input criteria during each of a first call and a second call to the numerical solver.

44. The method of configuring the operation of a plant of claim 43, wherein providing the numerical solver different plant configuration input criteria during each of the calls includes providing the same set of ambient conditions, plant equipment operating costs, and energy demands as the plant configuration input criteria during each of the first call and the second call to the numerical solver but providing a different set of equipment constraints to the numerical solver during the first call and the second call to the numerical solver.

45. The method of configuring the operation of a plant of claim 43, wherein providing the numerical solver different plant configuration input criteria during each of the calls includes providing the same set of ambient conditions, plant equipment operating costs, and energy demands as the plant configuration input criteria during each of the first call and the second call to the numerical solver but providing a subset of equipment to use as constraints to the numerical solver during the second call to the numerical solver.

46. The method of configuring the operation of a plant of claim 38, wherein determining an operational configuration of the set of interconnected plant equipment that minimizes or maximizes the objective function in a first call to the numerical solver includes using the objective function to determine an optimal set of plant equipment to use, and wherein determining an operational configuration of the set of interconnected plant equipment that minimizes or maximizes the objective function in a second call to the numerical solver includes using the objective function to determine an optimal set of equipment operational parameters for the optimal set of plant equipment.

47. The method of configuring the operation of a plant of claim 38, wherein determining an operational configuration of the set of interconnected plant equipment that minimizes or maximizes the objective function includes using different equipment models for the same plant equipment during first and second calls to the numerical solver.

48. The method of configuring the operation of a plant of claim 38, wherein determining an operational configuration of the set of interconnected plant equipment that minimizes or maximizes the objective function includes using different sets of equipment operational constraints during the first and second calls to the numerical solver.

49. The method of configuring the operation of a plant of claim 38, including using an output of the numerical solver from a first call to the numerical solver to determine one or more of the plant configuration input criteria for use in a second call to the numerical solver.

* * * * *